United States Patent
Shih et al.

(10) Patent No.: US 11,209,578 B2
(45) Date of Patent: Dec. 28, 2021

(54) CAMERA DEVICE

(71) Applicants: Sintai Optical (Shenzhen) Co., Ltd., ShenZhen (CN); Asia Optical Co., Inc., Taichung (TW)

(72) Inventors: Ming-Wei Shih, Taichung (TW); Hsi-Ling Chang, Taichung (TW); Chien-Hung Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 124 days.

(21) Appl. No.: 16/546,446

(22) Filed: Aug. 21, 2019

(65) Prior Publication Data
US 2019/0377164 A1 Dec. 12, 2019

Related U.S. Application Data

(63) Continuation-in-part of application No. 15/822,406, filed on Nov. 27, 2017, now Pat. No. 10,436,954.

(30) Foreign Application Priority Data

Aug. 2, 2017 (TW) .................................. 106126040

(51) Int. Cl.
*G02B 5/00* (2006.01)
*G02B 13/00* (2006.01)

(52) U.S. Cl.
CPC .......... *G02B 5/005* (2013.01); *G02B 13/0055* (2013.01)

(58) Field of Classification Search
None
See application file for complete search history.

(56) References Cited

U.S. PATENT DOCUMENTS 4,047,807 A 9/1977 Okano et al.
5,648,877 A * 7/1997 Schnitzlein ............ G02B 5/005
359/739

(Continued)

FOREIGN PATENT DOCUMENTS

CN 205643983 U 10/2016
JP 2002258132 A 9/2002
(Continued)

OTHER PUBLICATIONS

TW Office Action dated Dec. 11, 2017 in corresponding Taiwan application (No. 106126040).
(Continued)

*Primary Examiner* — Darryl J Collins
(74) *Attorney, Agent, or Firm* — McClure, Qualey & Rodack, LLP

(57) ABSTRACT

A camera device includes a plurality of lenses and an annular body having a fixed hole. The plurality of lenses and the annular body are arranged between an object side and an image side along an optical axis. The annular body includes an annular main body, an outer circumferential portion, and an inner circumferential portion, wherein the annular main body connects to the outer circumferential portion and the inner circumferential portion, and the inner circumferential portion is non-circular and surrounds the optical axis to form the fixed hole. The camera device satisfies: $EFL/\sqrt{4A/\pi} = (EFL/Dx + EFL/Dy) \times K1$; $K1 \leq 0.49$, where EFL is an effective focal length of the camera device, A is an area of the fixed hole, K1 is a coefficient, Dx is a maximum dimension of the fixed hole through which the optical axis passes, and Dy is a minimum dimension of the fixed hole through which the optical axis passes.

18 Claims, 25 Drawing Sheets

(56) References Cited

U.S. PATENT DOCUMENTS

| | | |
|---|---|---|
| 6,538,827 B2 | 3/2003 | Bos |
| 6,556,361 B1 | 4/2003 | Smith et al. |
| 6,724,546 B2 * | 4/2004 | Nishimae ............ G02B 26/008 348/E5.142 |
| 6,942,349 B2 * | 9/2005 | Inamoto ............... G03B 21/142 353/100 |
| 7,414,665 B2 | 8/2008 | Watanabe et al. |
| 8,837,060 B2 * | 9/2014 | Lin ...................... G02B 13/004 359/740 |
| 9,341,813 B1 | 5/2016 | Lin et al. |
| 10,712,635 B2 * | 7/2020 | Chalenko ............ G03B 17/565 |
| 2001/0003480 A1 | 6/2001 | Ryuk et al. |
| 2005/0031338 A1 | 2/2005 | Koyama et al. |
| 2007/0053077 A1 | 3/2007 | Lin et al. |
| 2007/0092246 A1 | 4/2007 | Aoki et al. |
| 2009/0303617 A1 | 12/2009 | Chang |
| 2011/0267696 A1 | 11/2011 | Tsuji |
| 2013/0329026 A1 | 12/2013 | Hida et al. |
| 2014/0016216 A1 | 1/2014 | Mori et al. |
| 2015/0346470 A1 | 12/2015 | Sugiyama |
| 2018/0095235 A1 | 4/2018 | Chang et al. |
| 2020/0249447 A1 * | 8/2020 | Chen .................... H04N 5/2621 |

FOREIGN PATENT DOCUMENTS

| | | |
|---|---|---|
| JP | 200488181 A | 3/2004 |
| TW | 200728791 A | 8/2007 |
| TW | 201303406 A | 1/2013 |
| TW | 201416700 A | 5/2014 |

OTHER PUBLICATIONS

English translation of TW Office Action dated Dec. 11, 2017 in corresponding Taiwan application (No. 106126040).

* cited by examiner

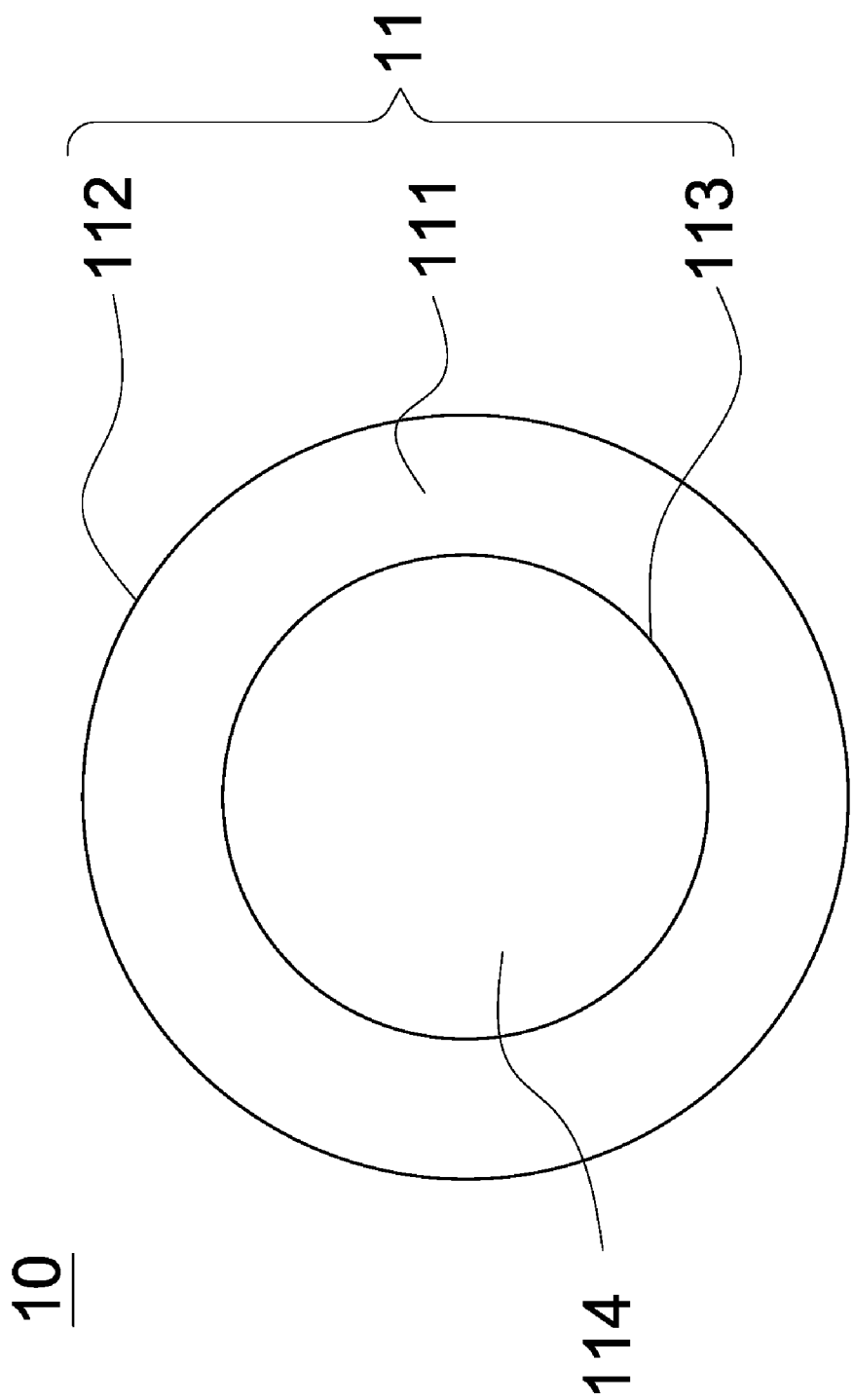

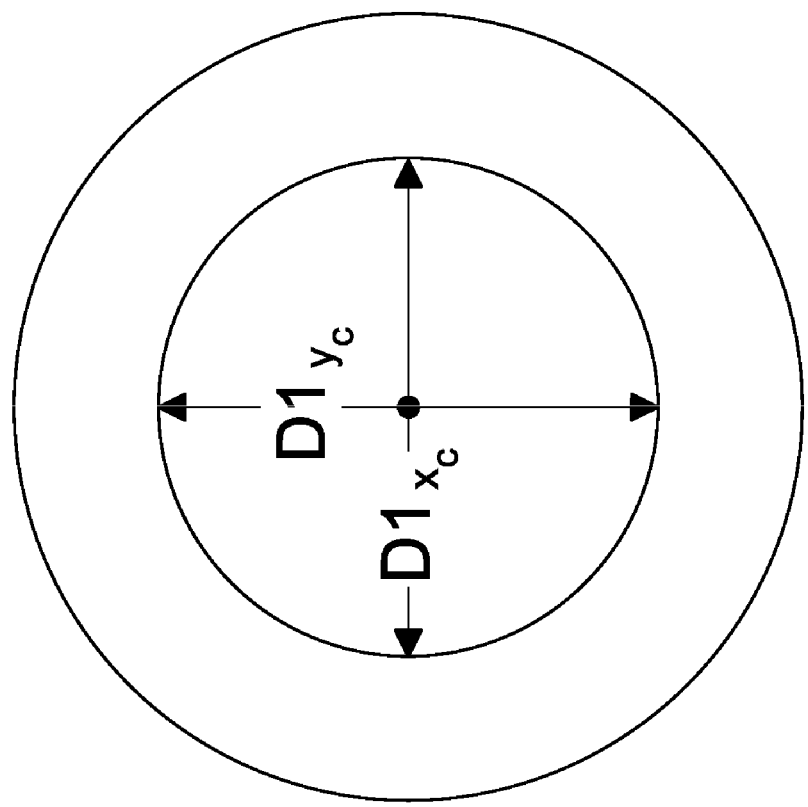

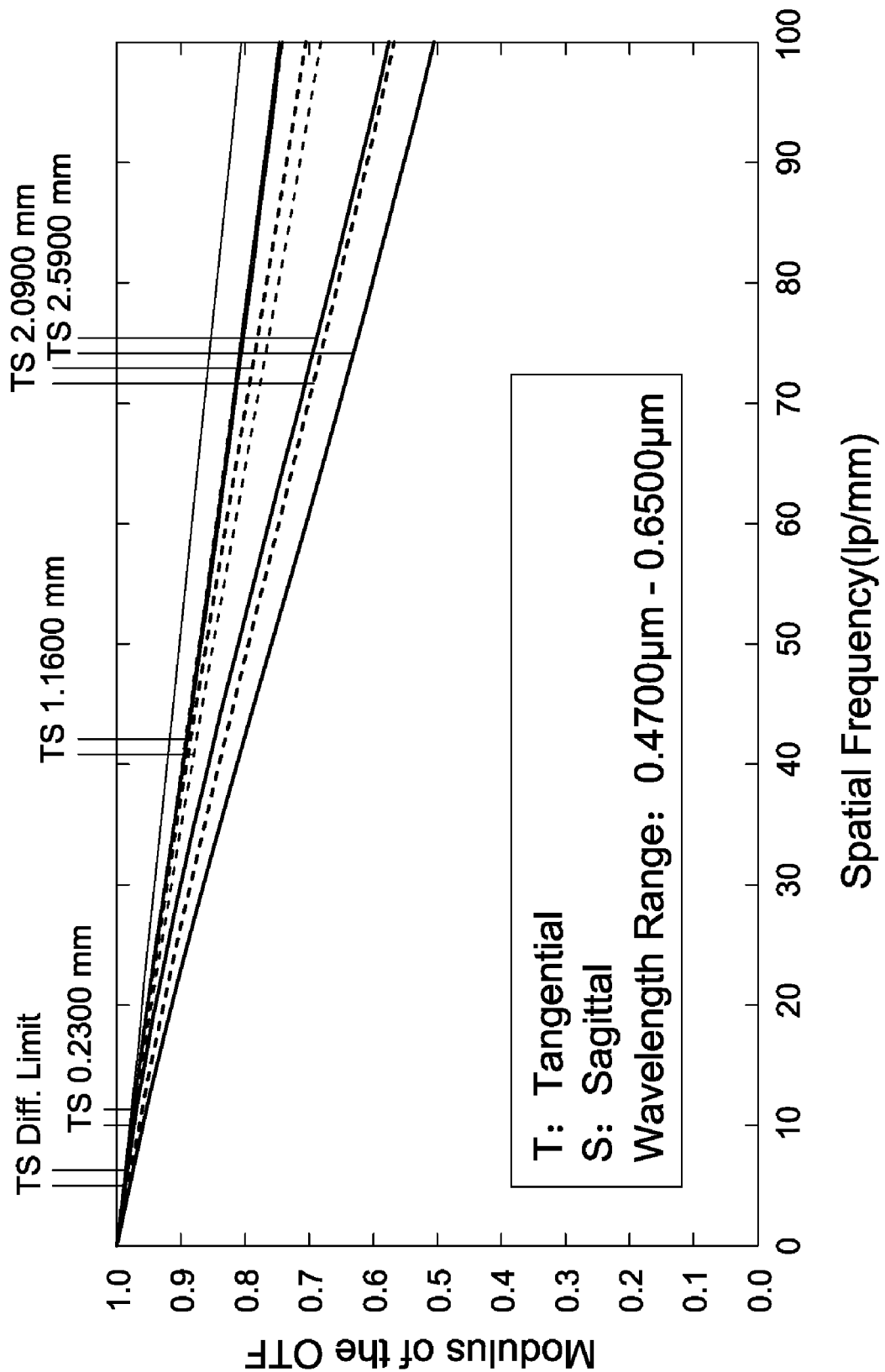

CAMERA DEVICE

CROSS REFERENCE TO RELATED APPLICATIONS

This application is a Continuation-In-Part of pending U.S. patent application Ser. No. 15/822,406, filed Nov. 27, 2017 and entitled "CAMERA DEVICE", now U.S. Pat. No. 10,436,954.

BACKGROUND OF THE INVENTION

Field of the Invention

The invention relates to a camera device.

Description of the Related Art

Mobile phone manufacturers have been pursuing thin mobile phones for a long time. The thickness of a camera device used in mobile phone is greatly limited by the thickness of the mobile phone itself. Indeed, the thickness of the camera device cannot exceed the thickness of the mobile phone. For example, if a camera device is set to a thickness not exceeding Dy mm, it is important to design the camera device to meet the thickness requirement and maintain good optical performance. It is well known that the aperture of a mobile phone is designed to have a circular shape. However, if the shape of the aperture is maintained to a circle, the thickness and size of the overall lens assembly are too large and cannot achieve thinning, maintain the same aperture size (F-number), and good optical performance all at the same time. The aperture of a conventional DSC camera is larger than that of the mobile phone's, so that the maximum dimension of a hole through which an optical axis passes is more larger than 1 mm to 5 mm for the conventional DSC camera. Those skilled in the art usually think that the maximum dimension of the hole through which the optical axis passes is between 20 mm and 30 mm for the conventional DSC camera, and even exceeds 30 mm. FIG. 1 shows a well known aperture of a lens assembly for a mobile phone, wherein the aperture 10 includes an annular body 11 which includes an annular main body 111, an outer circumferential portion 112, an inner circumferential portion 113, and a fixed hole 114. The outer circumferential portion 112 is circular and the fixed hole 114 surrounded by the inner circumferential portion 113 is also circular. A well known periscopic lens assembly is featured with a shortened total length. However, if an aperture shaped like that shown in FIG. 1 is included in a periscopic lens assembly, then thinning the periscopic lens assembly and a mobile phone containing the periscopic lens assembly will reduce the amount of light entering the camera device (under the condition that the circular aperture of the well known and the non-circular aperture of the present invention have the same thickness Dy), that is the diameter of the hole 114 will become smaller and the F-number of the camera device will become larger. When the F-number becomes larger, the image quality will be degraded. In addition, a general lens assembly used for some special applications has the same requirement (reducing thickness). Therefore, the invention provides a camera device using a non-circular annular body applied for general lens assemblies and/or periscopic lens assemblies to reduce the thickness of the lens assembly and maintain good optical performance.

BRIEF SUMMARY OF THE INVENTION

The invention provides a camera device to solve the above problem. The camera device of the invention includes an annual body which is provided with a non-circular region for light rays to pass through. By such arrangement, the thickness of the camera device can be reduced if the camera device includes a general lens assembly or a periscopic lens assembly.

The camera device in accordance with an exemplary embodiment of the invention includes a plurality of lenses and an annular body having a fixed hole. The plurality of lenses and the annular body are arranged between an object side and an image side along an optical axis. The annular body is disposed between the object side and the plurality of lenses, between the plurality of lenses, or between the plurality of lenses and the image side. The annular body includes an annular main body, an outer circumferential portion, and an inner circumferential portion, wherein the annular main body connects to the outer circumferential portion and the inner circumferential portion, the annular main body is disposed between the outer circumferential portion and the inner circumferential portion, and the inner circumferential portion is non-circular and surrounds the optical axis to form the fixed hole. The camera device satisfies: $EFL/\sqrt{4A/\pi}=(EFL/Dx+EFL/Dy)\times K1$; $K1 \leq 0.49$; where EFL is an effective focal length of the camera device, A is an area of the fixed hole, K1 is a coefficient, Dx is a maximum dimension of the fixed hole through which the optical axis passes, and Dy is a minimum dimension of the fixed hole through which the optical axis passes.

In another exemplary embodiment, the camera device satisfies:

$$(EFL/Dx)/(EFL/Dy) \leq 0.9.$$

In yet another exemplary embodiment, the camera device satisfies: $EFL/\sqrt{4A/\pi}=(EFL/Dx \times EFL/Dy)\times K2$; $K2<1/(EFL/\sqrt{4A/\pi})-0.01$, wherein EFL is an effective focal length of the camera device, A is an area of the fixed hole, K2 is a coefficient, Dx is a maximum dimension of the fixed hole through which the optical axis passes, and Dy is a minimum dimension of the fixed hole through which the optical axis passes.

In another exemplary embodiment, the camera device satisfies $EFL/\sqrt{4A/\pi}=(EFL/Dx-EFL/Dy)\times K3$; $7<K3<-2$, wherein EFL is an effective focal length of the camera device, A is an area of the fixed hole, K3 is a coefficient, Dx is a maximum dimension of the fixed hole through which the optical axis passes, and Dy is a minimum dimension of the fixed hole through which the optical axis passes.

In yet another exemplary embodiment, the camera device satisfies: $0 \text{ mm}<\Delta S/(Dx/2)<8 \text{ mm}$, wherein Dx is a maximum dimension of the fixed hole through which the optical axis passes, and $\Delta S$ is a difference between an area of a circle having a diameter of Dx and a cross sectional area of the fixed hole.

In another exemplary embodiment, the camera device satisfies $0.198<(Dx-Dy)/(Dx/2)<2$, wherein Dx is a maximum dimension of the fixed hole through which the optical axis passes, and Dy is a minimum dimension of the fixed hole through which the optical axis passes.

In yet another exemplary embodiment, the camera device further includes a reflection device disposed between the object side and the plurality of lenses.

In another exemplary embodiment, the outer circumferential portion is non-circular.

In yet another exemplary embodiment, a horizontal interval and a vertical interval are defined between the outer circumferential portion and the inner circumferential portion, and a ratio of the horizontal interval to the vertical interval is between 1.1 and 27.6.

In another exemplary embodiment, the vertical interval is between 0.112 mm and 5.55 mm.

The camera device in accordance with another exemplary embodiment of the invention includes a plurality of lenses and an annular body having a fixed hole. The plurality of lenses and the annular body are arranged between an object side and an image side along an optical axis. The annular body is disposed between the object side and the plurality of lenses, between the plurality of lenses, or between the plurality of lenses and the image side. The annular body includes an annular main body, an outer circumferential portion, and an inner circumferential portion, wherein the annular main body connects to the outer circumferential portion and the inner circumferential portion, the annular main body is disposed between the outer circumferential portion and the inner circumferential portion, and the inner circumferential portion is non-circular and surrounds the optical axis to form the fixed hole. The camera device satisfies: $EFL/\sqrt{4A/\pi} = (EFL/Dx \times EFL/Dy) \times K2$; $K2 < 1/(EFL/\sqrt{4A/\pi}) - 0.01$; where EFL is an effective focal length of the camera device, A is an area of the fixed hole, K2 is a coefficient, Dx is a maximum dimension of the fixed hole through which the optical axis passes, and Dy is a minimum dimension of the fixed hole through which the optical axis passes.

The camera device in accordance with another exemplary embodiment of the invention includes a plurality of lenses and an annular body having a fixed hole. The plurality of lenses and the annular body are arranged between an object side and an image side along an optical axis. The annular body is disposed between the object side and the plurality of lenses, between the plurality of lenses, or between the plurality of lenses and the image side. The annular body includes an annular main body, an outer circumferential portion, and an inner circumferential portion, wherein the annular main body connects to the outer circumferential portion and the inner circumferential portion, the annular main body is disposed between the outer circumferential portion and the inner circumferential portion, and the inner circumferential portion is non-circular and surrounds the optical axis to form the fixed hole. The camera device satisfies: $EFL/\sqrt{4A/\pi} = (EFL/Dx - EFL/Dy) \times K3$; $-7 < K3 < -2$; where EFL is an effective focal length of the camera device, A is an area of the fixed hole, K3 is a coefficient, Dx is a maximum dimension of the fixed hole through which the optical axis passes, and Dy is a minimum dimension of the fixed hole through which the optical axis passes.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 1 is a diagram of the well known aperture;

FIG. 2B is a traditional annular body design when the diameter of the hole is equal to $D1y_c$.

FIG. 7A is a modulation transfer function diagram of the camera device in Table 8 when F-number is equal to 2.71;

DETAILED DESCRIPTION OF THE INVENTION

The following description is made for the purpose of illustrating the general principles of the invention and should not be taken in a limiting sense. The scope of the invention is best determined by reference to the appended claims.

Figure 2A:
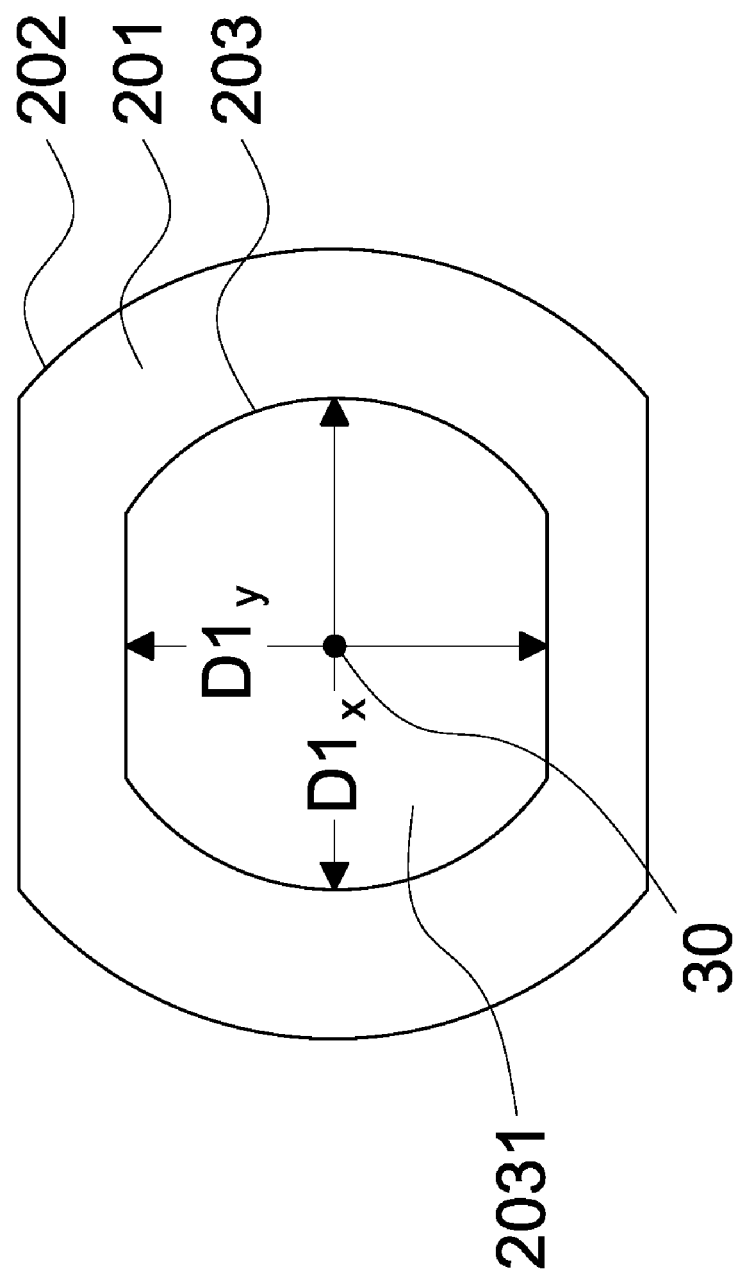
FIG. 2A depicts an annular body of a camera device in accordance with a first embodiment of the invention.

As shown in FIG. 2A, a camera device (not shown) in a first embodiment includes a plurality of lenses (not shown) and an annular body 20, which are arranged between an object side (not shown) and an image side (not shown) along an optical axis 30. The annular body can be regarded as an annular shade, which will not be repeatedly emphasized hereinafter. The annular body 20 is disposed between the object side (not shown) and the plurality of lenses (not shown). The annular body 20 includes an annular main body 201, an outer circumferential portion 202, and an inner circumferential portion 203. The outer circumferential portion 202 and the inner circumferential portion 203 include two straight edges and two arcuate edges respectively. The outer circumferential portion 202 is shaped to be non-circular for reduction of thickness of the camera device. The annular main body 201 connects to the outer circumferential portion 202 and the inner circumferential portion 203. The annular main body 201 is disposed between the outer circumferential portion 202 and the inner circumferential portion 203. The inner circumferential portion 203 is shaped like an oak barrel (non-circular) and surrounds the optical axis 30 to form a hole 2031. D1x is a maximum dimension of the hole 2031 defined by the inner circumferential portion 203 through which the optical axis 30 passes and D1y is a minimum dimension of the hole 2031 defined by the inner circumferential portion 203 through which the optical axis 30 passes. The hole 2031 allows the light rays from the object side (not shown) to pass through, and its dimension will affect the amount of the light rays passing through the camera device (not shown). Therefore, the main purpose of the annular body 20 is to work as an aperture. When the maximum dimension D1x of the hole 2031 is fixed, the annular body 20 will be flatter if the minimum dimension D1y which is smaller than the maximum dimension D1x is reduced. Therefore, if the flattened annular body 20 is included in a general lens assembly or a periscopic lens assembly, then the thickness of the lens assembly can be effectively reduced.

The F-number of a camera device is equal to the effective focal length (f) divided by the entrance pupil diameter (D), and the mathematical equation can be represented by F-number=f/D. Since the entrance pupil area A is equal to $\pi \times (D/2)^2$, F-number=f/D can be rewritten as F-number=f/$2\times(\pi/A)^{1/2}$. Therefore, the larger the entrance pupil area A, the smaller the F-number when the effective focal length (f) of the camera device is the same.

Table 1 shows data for the camera device of the first embodiment of the invention, wherein f is fixed to 15 mm, D1x is fixed to 5.55 mm, and $A1_x$ is fixed to 24.1799625 mm$^2$, f is an effective focal length of the camera device (not shown), D1x is a maximum dimension of the hole 2031 defined by the inner circumferential portion 203 through which the optical axis 30 passes, D1y is a minimum dimension of the hole 2031 defined by the inner circumferential portion 203 through which the optical axis 30 passes, $A1_x$ is an area of a circle having a diameter of D1x and $\Delta S1$ is a difference between the area of the circle having the diameter of D1x and a cross sectional area of the hole 2031. If D1y ranges from 5.55 mm to 0.5 mm, then F-number ranges from 2.70 to 8.38, D1x/D1y ranges from 1.0 to 11.1, (D1x−D1y)/(D1x/2) ranges from 0.0 to 1.81981982, $\Delta S1/(D1x/2)$ ranges from 0.0 mm to 7.808527027 mm, and $(A1_x - \Delta S1)/A1_x$ ranges from 1.0 to 0.103858722.

Under the same F-number condition, the camera device provided with a non-circular annular body has a thickness less than the conventional camera device provided with a circular annular body, which can be verified by Table 1. More specifically, the camera device with circular annular body will has the same F-number as the camera device with non-circular annular body when the hole area of the circular annular body is equal to that of the non-circular annular body. The verification method can be implemented step by step according to the following steps 1-6.

Step 1: Selecting an F-number value from Table 1 and obtaining the Dy and Hole Area values of an embodiment; Step 2: Letting a circular annular body have an area equal to the Hole Area selected in step 1, because in the same F-number condition, the hole area of the circular annular body is equal to the hole area of the non-circular annular body; Step 3: Calculating the radius of the hole of the circular annular body which is equal to the square root of "a ratio of the Hole Area to Pi (≈23.14159)"; Step 4: Calculating the diameter of the hole of the circular annular body (i.e. thickness Dy), by doubling the radius of the hole of the circular annular body; Step 5: Subtracting the Dy value of the non-circular annular body from the Dy value of the circular annular body to obtain a reduced thickness; Step 6: Calculating the percentage of size reduction, arising from use of the non-circular annular body, by dividing the reduced thickness obtained from Step 5 by Dy value of the circular annular body.

Taking F-number=2.85 from the column "F-number" for a camera device with non-circular annular body as an example, it can be seen from Table 1 that the hole area of the non-circular annular body is equal to 21.6741 mm$^2$ in the column "Hole Area (mm$^2$)" and D1y is equal to 4.44 mm in the column "D1y (mm)" (Step 1), so that the hole area of the circular annular body of a camera device is equal to 21.6741 mm$^2$ (Step 2). If an area of a circle is equal to 21.6741 mm$^2$, then the radius is equal to 2.63 mm and can be seen in the column "Radius of circular annular body (mm)" (square root of 21.6741/Pi) (Step 3), so that Dx and Dy are equal to 5.25 mm and can be seen in the column "Dy of circular annular body (mm)" (2×2.62661004 mm=5.25 mm) for a circular annular body (Step 4). The thickness reduction value of the non-circular annular body is 0.81 mm that can be seen in the column "Size Reduction (mm)" and the thickness of the non-circular annular body is less than the circular annular body (5.25 mm−4.44 mm=0.81 mm) (Step 5). That is to say, the percentage of size reduction is 15.48% and can be seen in the column "Reduction Rate (%)" (0.81 mm/5.25 mm=15.48%) (Step 6).

The data in the column "Size Reduction (mm)" and "Reduction Rate (%)" of Table 1 can again prove that the thickness of the camera device with non-circular annular body is significantly smaller than that of the camera device with circular annular body under the same F-number that can maintain good optical performance at the same time.

Furthermore, according to Table 1, it can be calculated that under the condition of the same F-number value, a camera device with non-circular annular body has an EFL (Effective Focal Length) significantly smaller than that of the camera device with fixed circular annular body. The calculated data are shown in the column "EFL of the Same F-number with a Circular Hole (mm)" of Table 1. The F-number of a camera device is equal to the EFL divided by the diameter (D) of circular hole (the mathematical equation can be represented by F-number=EFL/D), so that EFL is equal to DxF-number. In Table 1, row 6, when F-number is 2.75, the EFL of non-circular annular body is 15 mm and can be seen in the column "EFL (mm)" presenting the EFL of non-circular annular body. Regarding the circular annular body having the same value (2.75) of F-number and can be seen in the column "F-number" presenting the F-number of non-circular annular body, if the circular hole has a fixed diameter (D) of 5.55 mm and can be seen in the column "Diameter of Circular Hole (mm)" presenting the value of diameter of circular hole which is the same with the Dx of non-circular annular body, then the corresponding EFL of circular annular body is 15.26 mm (EFL of circular annular body=D×F-number=5.55×2.75) which is larger than the EFL (15 mm) of the present application.

In accordance with aforementioned calculation method, the EFL of the camera device with fixed circular annular body can be calculated and shown in the column "EFL of the Same F-number with a Circular Hole (mm)" of Table 1. The data in the column "EFL of the Same F-number with a Circular Hole (mm)" of Table 1 can again prove that under the condition of the same F-number value, a camera device with non-circular annular body has an EFL significantly smaller than that of the camera device with fixed circular annular body.

It is therefore understood that the present invention is able to effectively reduce the thickness of the camera device, maintain good optical performance of the camera device, and provide the camera device with a smaller EFL.

mm, D1x is fixed to 3.0872 mm, and $A1_x$ is fixed to 7.481681014 mm². If D1y ranges from 3.0872 mm to 0.112 mm, then F-number ranges from 1.65 to 8.07, D1x/D1y ranges from 1.0 to 27.56428751, (D1x−D1y)/(D1x/2) ranges from 0.0 to 1.927442343, $\Delta S1$/(D1x/2) ranges from 0.0 mm to 4.644779097 mm, and $(A1_x-\Delta S1)/A1_x$ ranges from 1.0 to 0.041701858.

Referring to the description and calculation method as paragraphs [0056]-[0060], the data in the column "Size Reduction (mm)" and "Reduction Rate (%)" of Table 2 can again prove that the thickness of the camera device with non-circular annular body is significantly smaller than that of the camera device with circular annular body under the same F-number that can maintain good optical performance at the same time, and the data in column "EFL of the Same F-number with a Circular Hole (mm)" of Table 2 can again

TABLE 1

Effective focal Length = 15 mm
D1x = 5.55 mm
$A1_x$ = 24.1799625 mm²

| D1y (mm) | D1x/ D1y | (D1x − D1y)/ (D1x/2) | Hole Area (mm²) | Δ S1 (mm²) | Δ S1/(D1x/2) (mm) | $(A1_x - \Delta S1)/ A1_x$ |
|---|---|---|---|---|---|---|
| 5.55 | 1.0 | 0.0 | 24.1799625 | 0.0 | 0.0 | 1.0 |
| 5 | 1.11 | 0.198198198 | 23.2998 | 0.8801625 | 0.317175676 | 0.963599509 |
| 4.44 | 1.25 | 0.4 | 21.6741 | 2.5058625 | 0.903013514 | 0.896366154 |
| 4 | 1.3875 | 0.558558559 | 20.0904 | 4.0895625 | 1.473716216 | 0.830869775 |
| 2 | 2.775 | 1.279279279 | 10.05 | 14.1299625 | 5.091878378 | 0.415633399 |
| 1.33 | 4.172932331 | 1.520720721 | 6.67 | 17.5099625 | 6.309896396 | 0.275848236 |
| 1 | 5.55 | 1.63963964 | 5.02 | 19.1599625 | 6.904490991 | 0.207609917 |
| 0.8 | 6.9375 | 1.711711712 | 4.02 | 20.1599625 | 7.264851351 | 0.16625336 |
| 0.67 | 8.28358209 | 1.758558559 | 3.35 | 20.8299625 | 7.506292793 | 0.138544466 |
| 0.57 | 9.736842105 | 1.794594595 | 2.87 | 21.3099625 | 7.679265766 | 0.118693319 |
| 0.5 | 11.1 | 1.81981982 | 2.5113 | 21.6686625 | 7.808527027 | 0.103858722 |

| D1y (mm) | F-number | Radius of circular annular body (mm) | Dy of circular annular body (mm) | Size Reduction (mm) | Reduction Rate (%) | EFL (mm) | Diameter of Circular Hole (mm) | EFL of the Same F-number with a Circular Hole (mm) |
|---|---|---|---|---|---|---|---|---|
| 5.55 | 2.70 | | | | | | | |
| 5 | 2.75 | 2.72 | 5.45 | 0.45 | 8.20 | 15 | 5.55 | 15.26 |
| 4.44 | 2.85 | 2.63 | 5.25 | 0.81 | 15.48 | 15 | 5.55 | 15.82 |
| 4 | 2.96 | 2.53 | 5.06 | 1.06 | 20.91 | 15 | 5.55 | 16.43 |
| 2 | 4.19 | 1.79 | 3.58 | 1.58 | 44.09 | 15 | 5.55 | 23.25 |
| 1.33 | 5.14 | 1.46 | 2.91 | 1.58 | 54.36 | 15 | 5.55 | 28.53 |
| 1 | 5.93 | 1.26 | 2.53 | 1.53 | 60.45 | 15 | 5.55 | 32.91 |
| 0.8 | 6.62 | 1.13 | 2.26 | 1.46 | 64.64 | 15 | 5.55 | 36.74 |
| 0.67 | 7.26 | 1.03 | 2.07 | 1.40 | 67.56 | 15 | 5.55 | 40.29 |
| 0.57 | 7.84 | 0.96 | 1.91 | 1.34 | 70.18 | 15 | 5.55 | 43.51 |
| 0.5 | 8.38 | 0.89 | 1.79 | 1.29 | 72.04 | 15 | 5.55 | 46.51 |

D1x: a maximum dimension of the hole 2031 through which the optical axis 30 passes
D1y: a minimum dimension of the hole 2031 through which the optical axis 30 passes
$A1_x$: an area of a circle having a diameter of D1x
Δ S1: a difference between the area of the circle having the diameter of D1x and a cross sectional area of the hole 2031

Figure 3A:
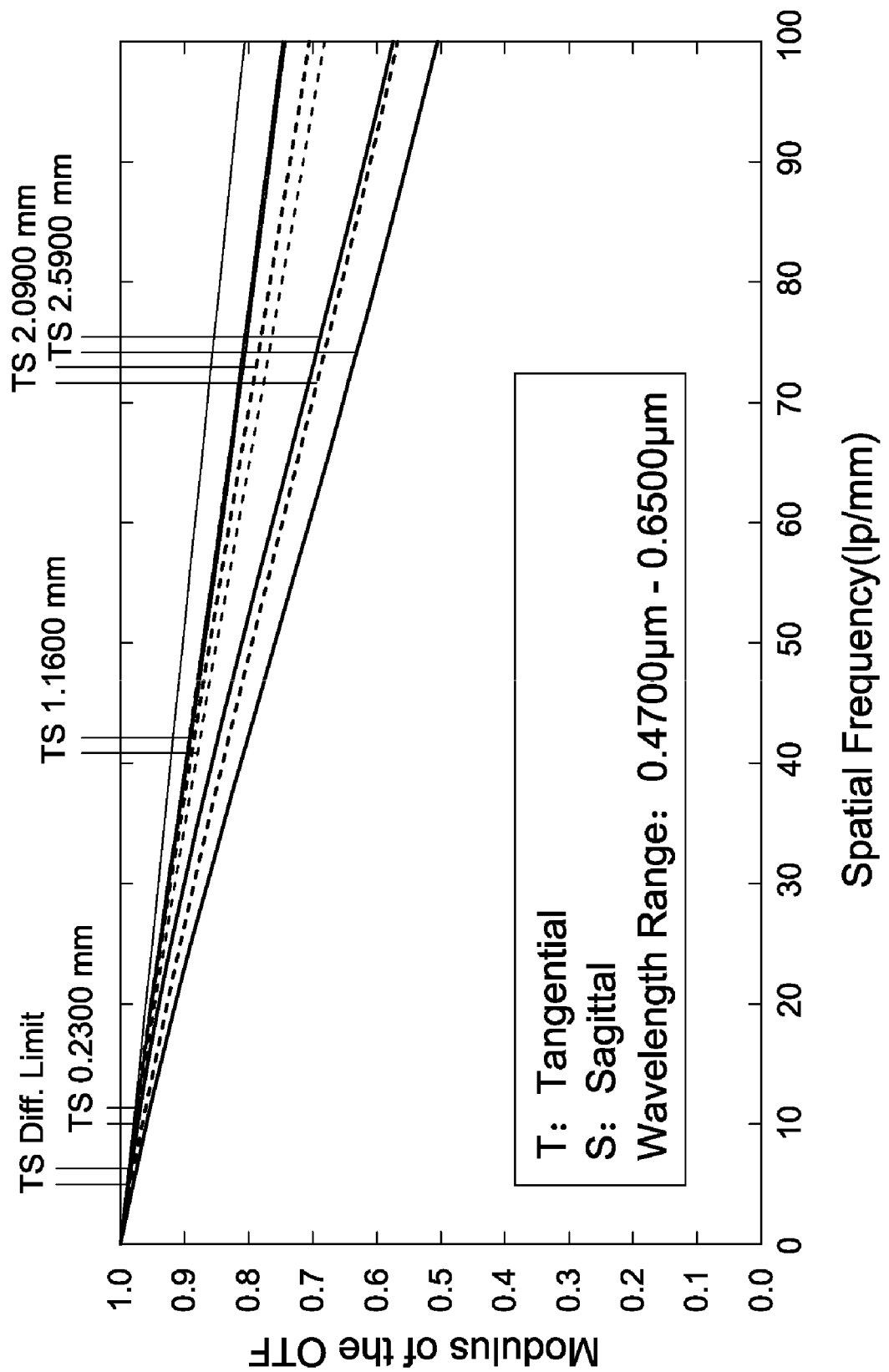
FIG. 3A is a modulation transfer function diagram of the camera device in Table 1 when F-number is equal to 2.70.
Figure 3B:
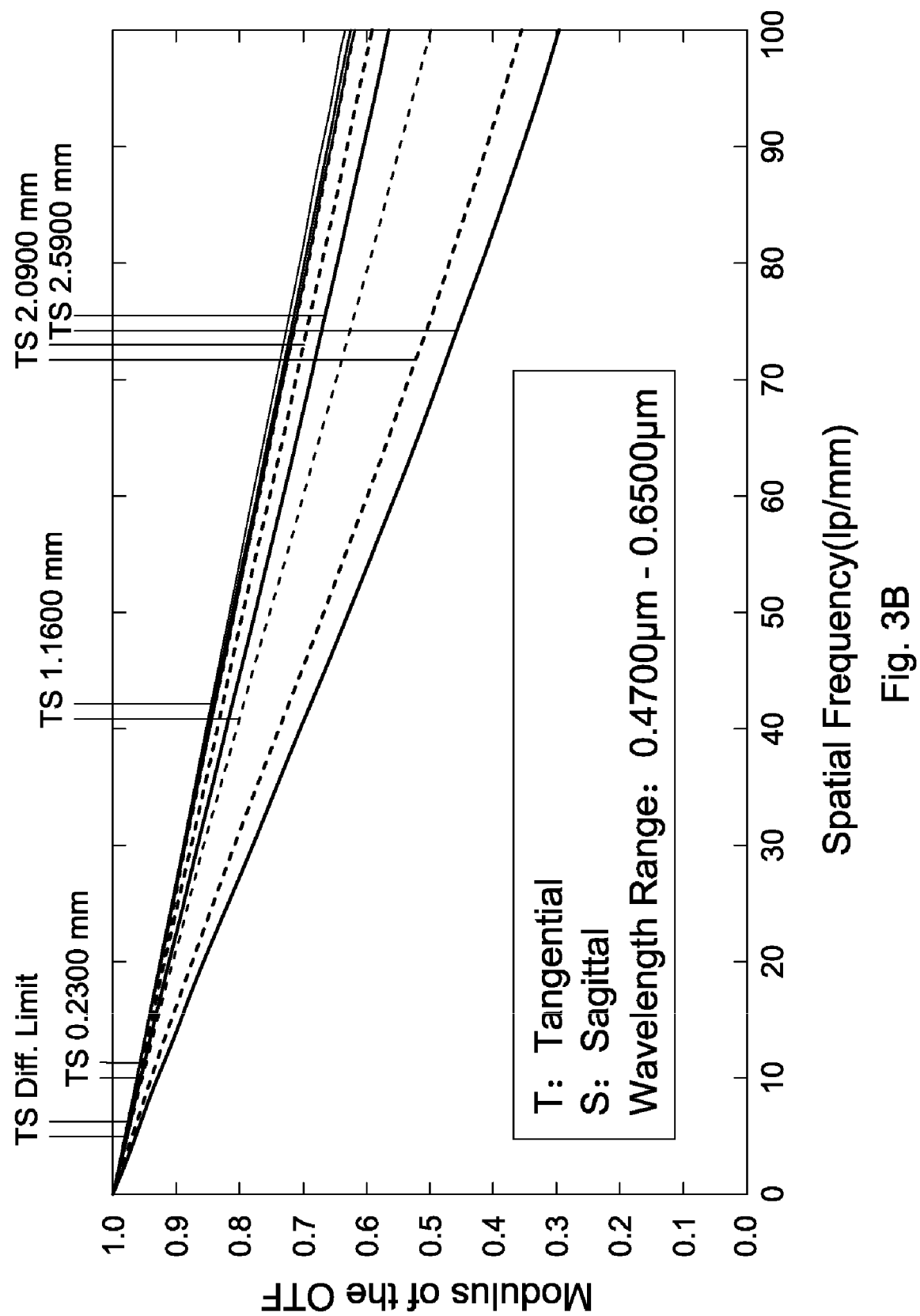
FIG. 3B is a modulation transfer function diagram of the camera device in Table 1 when F-number is equal to 5.14.
Figure 3C:
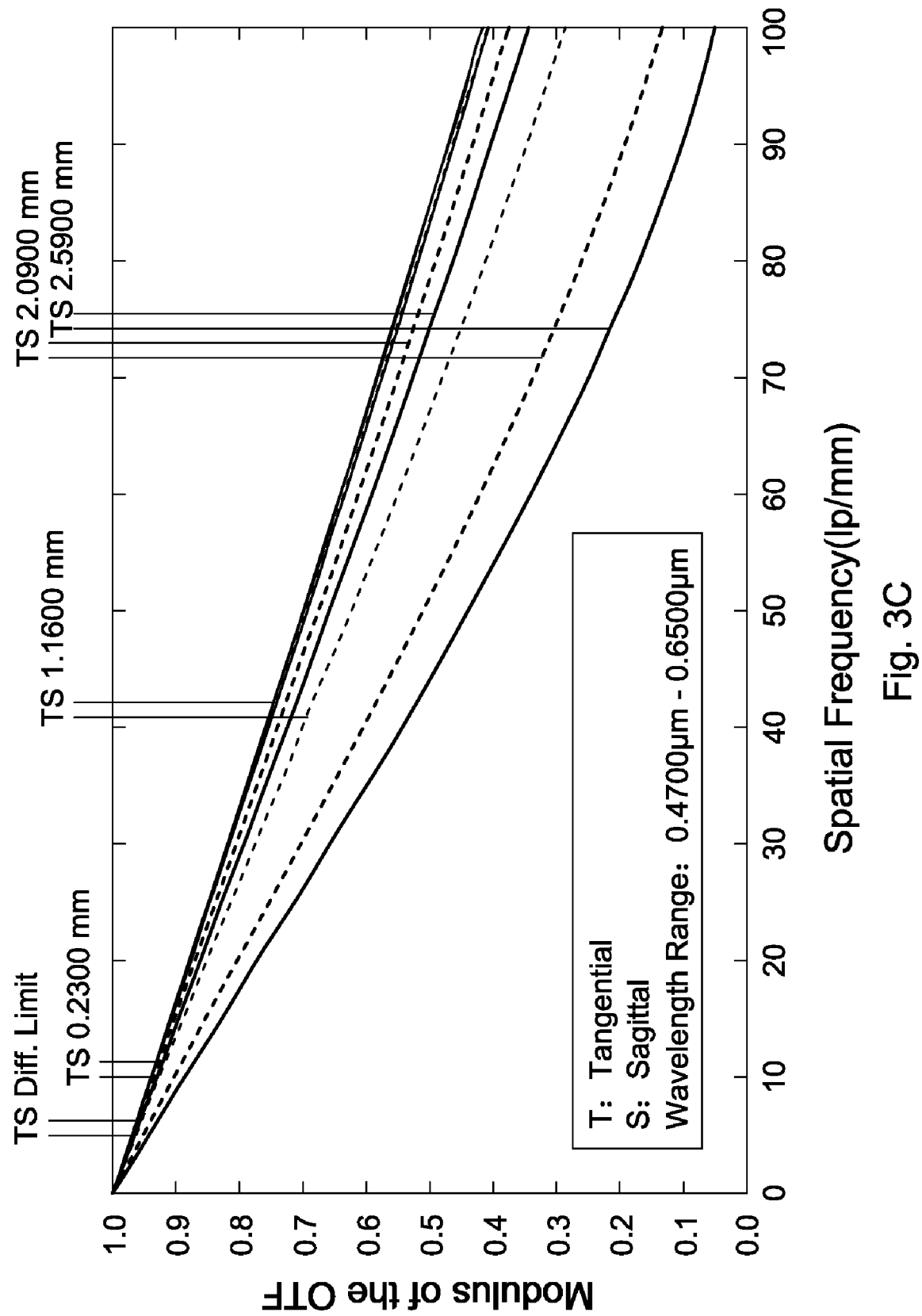
FIG. 3C is a modulation transfer function diagram of the camera device in Table 1 when F-number is equal to 8.38.

FIG. 3A shows the modulation transfer function diagram of the camera device in Table 1 when F-number is equal to 2.70. FIG. 3B shows the modulation transfer function diagram of the camera device in Table 1 when F-number is equal to 5.14. FIG. 3C shows the modulation transfer function diagram of the camera device in Table 1 when F-number is equal to 8.38.

Table 2 shows other data for the camera device of the first embodiment of the invention, wherein f is fixed to 5.09389 prove that under the condition of the same F-number value, a camera device with non-circular annular body has an EFL significantly smaller than that of the camera device with fixed circular annular body.

It is therefore understood that the present invention is able to effectively reduce the thickness of the camera device, maintain good optical performance of the camera device, and provide the camera device with a smaller EFL.

TABLE 2

Effective focal Length = 5.09389 mm
D1x = 3.0872 mm
A1$_x$ = 7.481681014 mm$^2$

| D1y (mm) | D1x/D1y | (D1x − D1y)/(D1x/2) | Hole Area (mm$^2$) | Δ S1 (mm$^2$) | Δ S1/(D1x/2) (mm) | (A1$_x$ − Δ S1)/A1$_x$ |
|---|---|---|---|---|---|---|
| 3.0872 | 1.0 | 0.0 | 7.481681014 | 0.0 | 1.0 | 1.0 |
| 2.234 | 1.381915846 | 0.552733869 | 6.268 | 1.213681014 | 0.786266529 | 0.837779636 |
| 1.11 | 2.781261261 | 1.280901788 | 3.11 | 4.371681014 | 2.832133334 | 0.415681983 |
| 0.744 | 4.149462366 | 1.518009847 | 2.088 | 5.393681014 | 3.494221958 | 0.279081666 |
| 0.56 | 5.512857143 | 1.637211713 | 1.56 | 5.921681014 | 3.836279486 | 0.20850929 |
| 0.44 | 7.016363636 | 1.71495206 | 1.24 | 6.241681014 | 4.043587079 | 0.165738154 |
| 0.372 | 8.298924731 | 1.759004924 | 1.044 | 6.437681014 | 4.170562979 | 0.139540833 |
| 0.32 | 9.6475 | 1.792692407 | 0.892 | 6.589681014 | 4.269034086 | 0.119224543 |
| 0.278 | 11.10503597 | 1.819901529 | 0.78 | 6.701681014 | 4.341591743 | 0.104254645 |
| 0.248 | 12.4483871 | 1.839336616 | 0.696 | 6.785681014 | 4.396009986 | 0.093027222 |
| 0.22 | 14.03272727 | 1.85747603 | 0.6 | 6.881681014 | 4.458202264 | 0.080195881 |
| 0.148 | 20.85945946 | 1.904120238 | 0.416 | 7.065681014 | 4.57740413 | 0.055602477 |
| 0.112 | 27.56428571 | 1.927442343 | 0.312 | 7.169681014 | 4.644779097 | 0.041701858 |

| D1y (mm) | F-number | Radius of circular annular body (mm) | Dy of circular annular body (mm) | Size Reduction (mm) | Reduction Rate (%) | EFL (mm) | Diameter of Circular Hole (mm) | EFL of the Same F-number with a Circular Hole (mm) |
|---|---|---|---|---|---|---|---|---|
| 3.0872 | 1.65 | | | | | | | |
| 2.234 | 1.80 | 1.41 | 2.83 | 0.59 | 20.92 | 5.09 | 3.09 | 5.56 |
| 1.11 | 2.55 | 0.99 | 1.99 | 0.88 | 44.22 | 5.09 | 3.09 | 7.87 |
| 0.744 | 3.12 | 0.82 | 1.63 | 0.89 | 54.37 | 5.09 | 3.09 | 9.63 |
| 0.56 | 3.61 | 0.70 | 1.41 | 0.85 | 60.27 | 5.09 | 3.09 | 11.14 |
| 0.44 | 4.05 | 0.63 | 1.26 | 0.82 | 64.98 | 5.09 | 3.09 | 12.50 |
| 0.372 | 4.41 | 0.58 | 1.15 | 0.78 | 67.73 | 5.09 | 3.09 | 13.61 |
| 0.32 | 4.77 | 0.53 | 1.06 | 0.75 | 69.97 | 5.09 | 3.09 | 14.73 |
| 0.278 | 5.11 | 0.50 | 1.00 | 0.72 | 72.10 | 5.09 | 3.09 | 15.78 |
| 0.248 | 5.40 | 0.47 | 0.94 | 0.69 | 73.66 | 5.09 | 3.09 | 16.67 |
| 0.22 | 5.82 | 0.44 | 0.87 | 0.65 | 74.83 | 5.09 | 3.09 | 17.97 |
| 0.148 | 6.99 | 0.36 | 0.73 | 0.58 | 79.66 | 5.09 | 3.09 | 21.58 |
| 0.112 | 8.07 | 0.32 | 0.63 | 0.52 | 82.23 | 5.09 | 3.09 | 24.91 |

D1x: a maximum dimension of the hole 2031 through which the optical axis 30 passes
D1y: a minimum dimension of the hole 2031 through which the optical axis 30 passes
A1$_x$: an area of a circle having a diameter of D1x
Δ S1: a difference between the area of the circle having the diameter of D1x and a cross sectional area of the hole 2031

The modulation transfer function diagram of the camera device at different F-numbers in Table 2 is similar to in Table 1, so the illustration is omitted. The location of the annular body, the shape of the annular body (non-circular), and the conditions, all of which should be taken as a whole. The function of the invention is performed when all of them are performed.

Please refer to FIG. 2A and FIG. 2B. FIG. 2B shows a traditional annular body design with a circular diameter of D1y$_c$, wherein D1y$_c$ is equal to D1x$_c$, D1y$_c$ is equal to D1y, D1x$_c$ is smaller than D1x, D1x is larger than D1y, and D1y does not exceed the maximum thickness requirement of a mobile phone or a camera device.

Table 3 shows F-number of the camera device for different type of annular body when effective focal length (EFL) is equal to 15 mm. F-number of the camera device with the non-circular annular body (FIG. 2A) is equal to 2.85 and F-number of the camera device with the circular annular body (FIG. 2B) is equal to 3.4. That is, when the thickness requirement of the camera device and the annular body are the same, the camera device with the non-circular annular body (FIG. 2A) has smaller F-number value than that of the camera device with the circular annular body (FIG. 2B). The data of D1x, D1y, EFL and F-number of the camera device with non-circular annular body can be found in Table 1.

TABLE 3

| | Circular Annular Body (FIG. 2B) | | Non-circular Annular Body (FIG. 2A) | |
|---|---|---|---|---|
| | D1x$_c$ 4.44 mm | D1y$_c$ 4.44 mm | D1x 5.55 mm | D1y 4.44 mm |
| EFL | 15 mm | 15 mm | 15 mm | 15 mm |
| F-number | 3.4 | | 2.85 | |

Figure 3D:
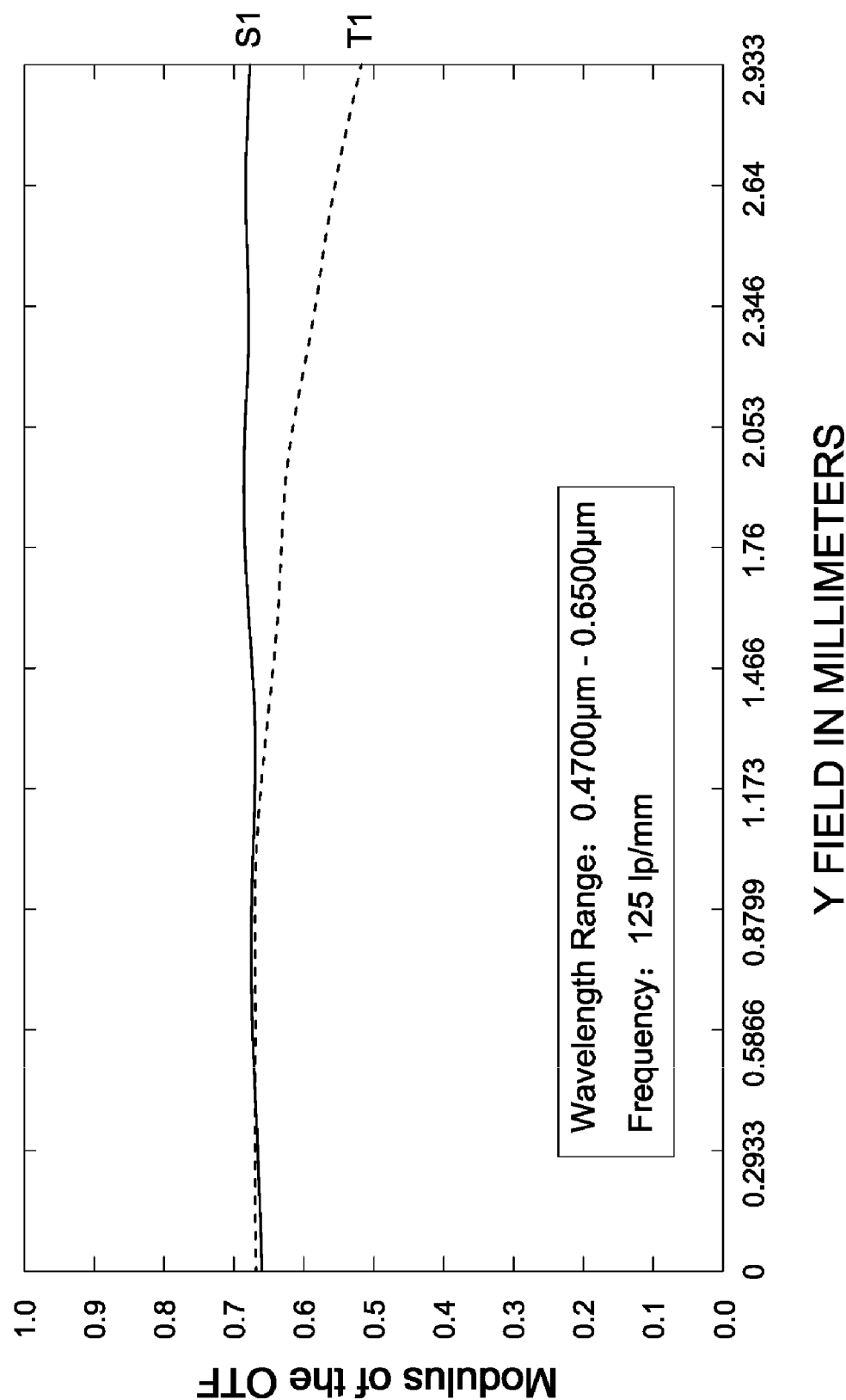
FIG. 3D is a modulation transfer function diagram of different fields of view for a camera device with a non-circular annular body (FIG. 2A), wherein the effective focal length of the camera device is equal to 15 mm, D1x is equal to 5.55 mm, D1y is equal to 4.44 mm.
Figure 3E:
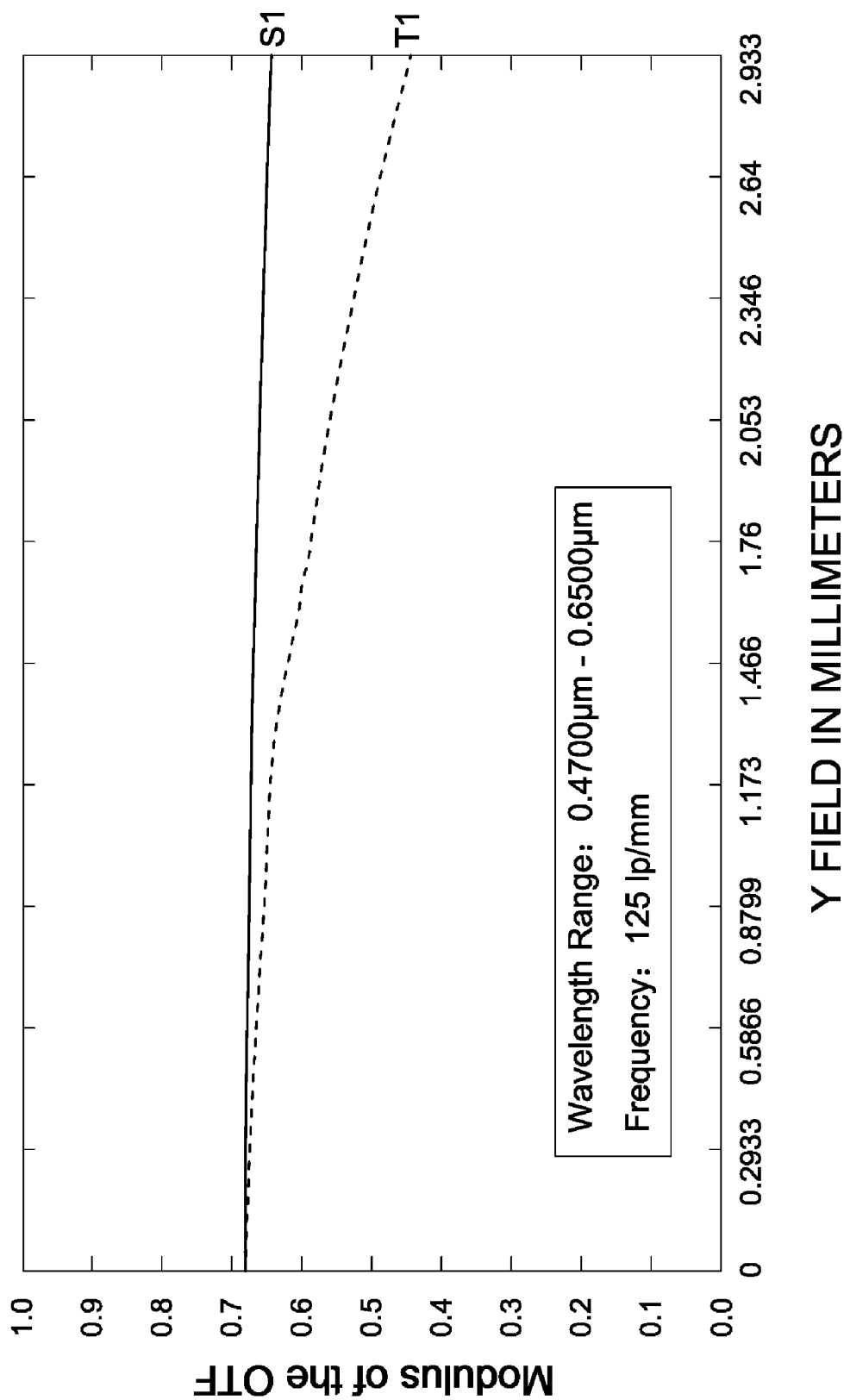
FIG. 3E is a modulation transfer function diagram of different fields of view for a camera device with a circular annular body (FIG. 2B), wherein the effective focal length of the camera device is equal to 15 mm, $D1x_c$ is equal to 4.44 mm, $D1y_c$ is equal to 4.44 mm.

FIG. 3D shows a modulation transfer function (MTF) diagram of different fields of view for a camera device with a non-circular annular body (FIG. 2A), wherein the effective focal length of the camera device is equal to 15 mm, D1x is equal to 5.55 mm, D1y is equal to 4.44 mm, and Table 4 as below shows the MTF values of different fields of view. FIG. 3E as below shows a modulation transfer function diagram of different fields of view for a camera device with a circular annular body (FIG. 2B), wherein the effective focal length of the camera device is equal to 15 mm, D1x$_c$ is equal to 4.44 mm, D1y$_c$ is equal to 4.44 mm, and Table 5 shows the MTF values of different fields of view. From FIG. 3D, Table 4, FIG. 3E, Table 5, there is a better MTF when the annular body is non-circular. That is to say, as the camera device has the same thickness requirement, the camera device with non-circular annular body (FIG. 2A) has better image quality than the camera device with circular annular body (FIG. 2B).

In summary, the camera device and the non-circular annular body of the present invention can achieve better optical performance under the condition that the thickness of the mobile phone is limited to the thickness of the camera device.

TABLE 4

| Field of View | MTF | |
|---|---|---|
| | T | S |
| 0F | 67% | 66% |
| 0.1F | 67% | 67% |
| 0.2F | 67% | 67% |
| 0.3F | 67% | 67% |
| 0.4F | 66% | 67% |
| 0.5F | 64% | 67% |
| 0.6F | 63% | 68% |
| 0.7F | 61% | 68% |
| 0.8F | 58% | 68% |
| 0.9F | 55% | 68% |
| 1.0F | 52% | 68% |

TABLE 5

| Field of View | MTF | |
|---|---|---|
| | T | S |
| 0F | 68% | 68% |
| 0.1F | 68% | 68% |
| 0.2F | 67% | 68% |
| 0.3F | 65% | 68% |
| 0.4F | 65% | 67% |
| 0.5F | 62% | 67% |
| 0.6F | 59% | 67% |
| 0.7F | 56% | 66% |
| 0.8F | 52% | 66% |
| 0.9F | 49% | 65% |
| 1.0F | 44% | 64% |

Figure 4:
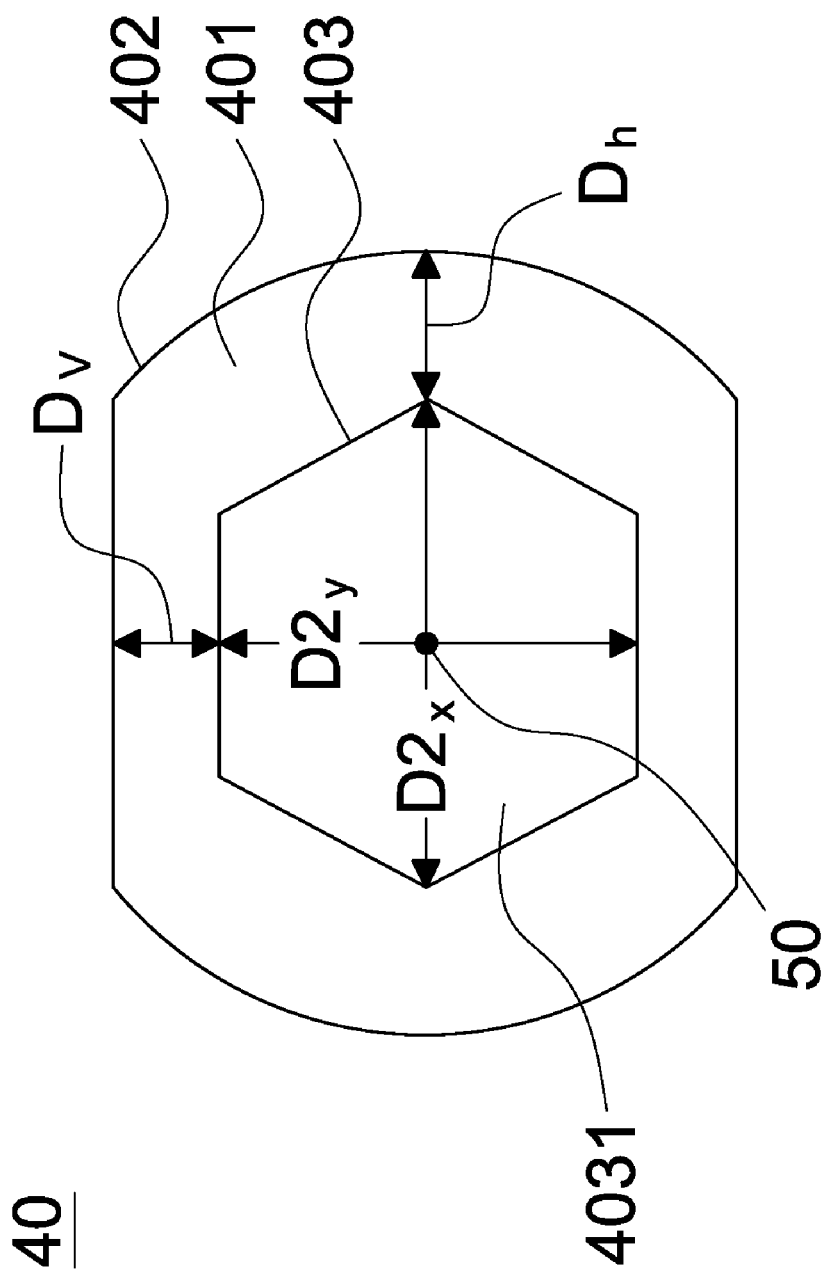
FIG. 4 is an annular body diagram of a camera device in accordance with a second embodiment of the invention.

As shown in FIG. 4, a camera device (not shown) in a second embodiment includes a plurality of lenses (not shown) and an annular body 40, which are arranged between an object side (not shown) and an image side (not shown) along an optical axis 50. The annular body 40 can be regarded as an annular shade, which will not be repeatedly emphasized hereinafter. The annular body 40 is disposed between the object side (not shown) and the plurality of lenses (not shown). The annular body 40 includes an annular main body 401, an outer circumferential portion 402, and an inner circumferential portion 403. The outer circumferential portion 402 includes two straight edges and two arcuate edges. The outer circumferential portion 402 is shaped to be non-circular for reduction of thickness of the camera device. The inner circumferential portion 403 includes six straight edges. The annular main body 401 connects to the outer circumferential portion 402 and the inner circumferential portion 403. The annular main body 401 is disposed between the outer circumferential portion 402 and the inner circumferential portion 403. The inner circumferential portion 403 is hexagonal (non-circular) and surrounds the optical axis 50 to form a hole 4031. D2x is a maximum dimension of the hole 4031 defined by the inner circumferential portion 403 through which the optical axis 50 passes and D2y is a minimum dimension of the hole 4031 defined by the inner circumferential portion 403 through which the optical axis 50 passes. The hole 4031 allows the light rays from the object side (not shown) to pass through, and its dimension will affect the amount of the light rays passing through the camera device (not shown). Therefore, the main purpose of the annular body 40 is to work as an aperture. When the maximum dimension D2x of the hole 4031 is fixed, the annular body 40 will be flatter if the minimum dimension D2y which is smaller than the maximum dimension D2x is reduced. Therefore, if the flattened annular body 40 is included in a general lens assembly or a periscopic lens assembly, then the thickness of the lens assembly can be effectively reduced.

Table 6 shows data for the camera device of the second embodiment of the invention, wherein f is fixed to 15 mm, D2x is fixed to 5.55 mm, $A2_x$ is fixed to 24.1799625 mm$^2$, f is an effective focal length of the camera device (not shown), D2x is a maximum dimension of the hole 4031 defined by the inner circumferential portion 403 through which the optical axis 50 passes, D2y is a minimum dimension of the hole 4031 defined by the inner circumferential portion 403 through which the optical axis 50 passes, $A2_x$ is an area of a circle having a diameter of D2x and ΔS2 is a difference between the area of the circle having the diameter of D2x and a cross sectional area of the hole 4031. If D2y ranges from 5.55 mm to 0.5 mm, then F-number ranges from 2.76 to 8.85, D2x/D2y ranges from 1.0 to 11.1, (D2x−D2y)/(D2x/2) ranges from 0.0 to 1.81981982, ΔS2/(D2x/2) ranges from 0.388490991 mm to 7.902328829 mm, and ($A2_x$− ΔS2)/$A2_x$ ranges from 0.955415047 to 0.09309361.

TABLE 6

Effective focal Length = 15 mm
D2x = 5.55 mm
$A2_x$ = 24.1799625 mm$^2$

| D2y (mm) | D2x/D2y | (D2x − D2y)/(D2x/2) | Hole Area (mm$^2$) | Δ S2 (mm$^2$) | Δ S2/(D2x/2) (mm) | ($A2_x$ − Δ S2)/$A2_x$ | F-number |
|---|---|---|---|---|---|---|---|
| 5.55 | 1.0 | 0.0 | 23.1019 | 1.0780625 | 0.388490991 | 0.955415047 | 2.76 |
| 5 | 1.11 | 0.198198198 | 21.5 | 2.6799625 | 0.965752252 | 0.889165978 | 2.86 |
| 4.44 | 1.25 | 0.4 | 19.7136 | 4.4663625 | 1.6095 | 0.815286624 | 2.99 |
| 4 | 1.3875 | 0.558558559 | 18.2 | 5.9799625 | 2.154941441 | 0.752689339 | 3.11 |
| 2 | 2.775 | 1.279279279 | 9.103 | 15.0769625 | 5.43313964 | 0.376468739 | 4.40 |
| 1.33 | 4.172932331 | 1.520720721 | 5.935 | 18.2449625 | 6.574761261 | 0.245451166 | 5.45 |
| 1 | 5.55 | 1.63963964 | 4.5224 | 19.6575625 | 7.083806306 | 0.187030894 | 6.24 |
| 0.8 | 6.9375 | 1.711711712 | 3.6945 | 20.4854625 | 7.382148649 | 0.1527918 | 6.91 |

TABLE 6-continued

| 0.67 | 8.28358209 | 1.758558559 | 2.9813 | 21.1986625 | 7.639157658 | 0.123296304 | 7.69 |
| 0.57 | 9.736842105 | 1.794594595 | 2.576 | 21.6039625 | 7.785211712 | 0.106534491 | 8.28 |
| 0.5 | 11.1 | 1.81981982 | 2.251 | 21.9289625 | 7.902328829 | 0.09309361 | 8.85 |

D2x: a maximum dimension of the hole 4031 through which the optical axis 50 passes
D2y: a minimum dimension of the hole 4031 through which the optical axis 50 passes
$A2_x$: an area of a circle having a diameter of D2x
Δ S2: a difference between the area of the circle having the diameter of D2x and a cross sectional area of the hole 4031

Figure 5A:
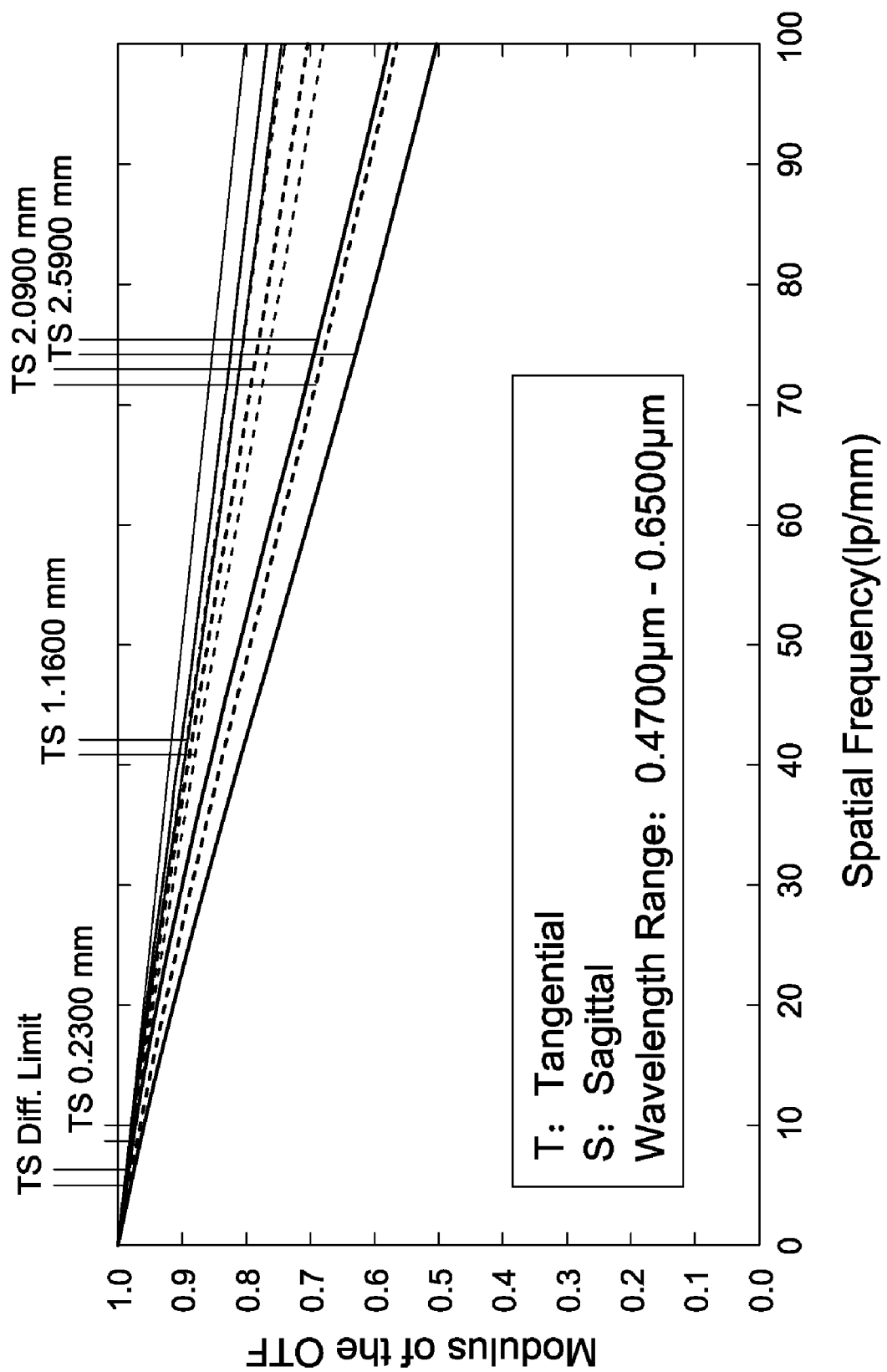
FIG. 5A is a modulation transfer function diagram of the camera device in Table 6 when F-number is equal to 2.76.
Figure 5B:
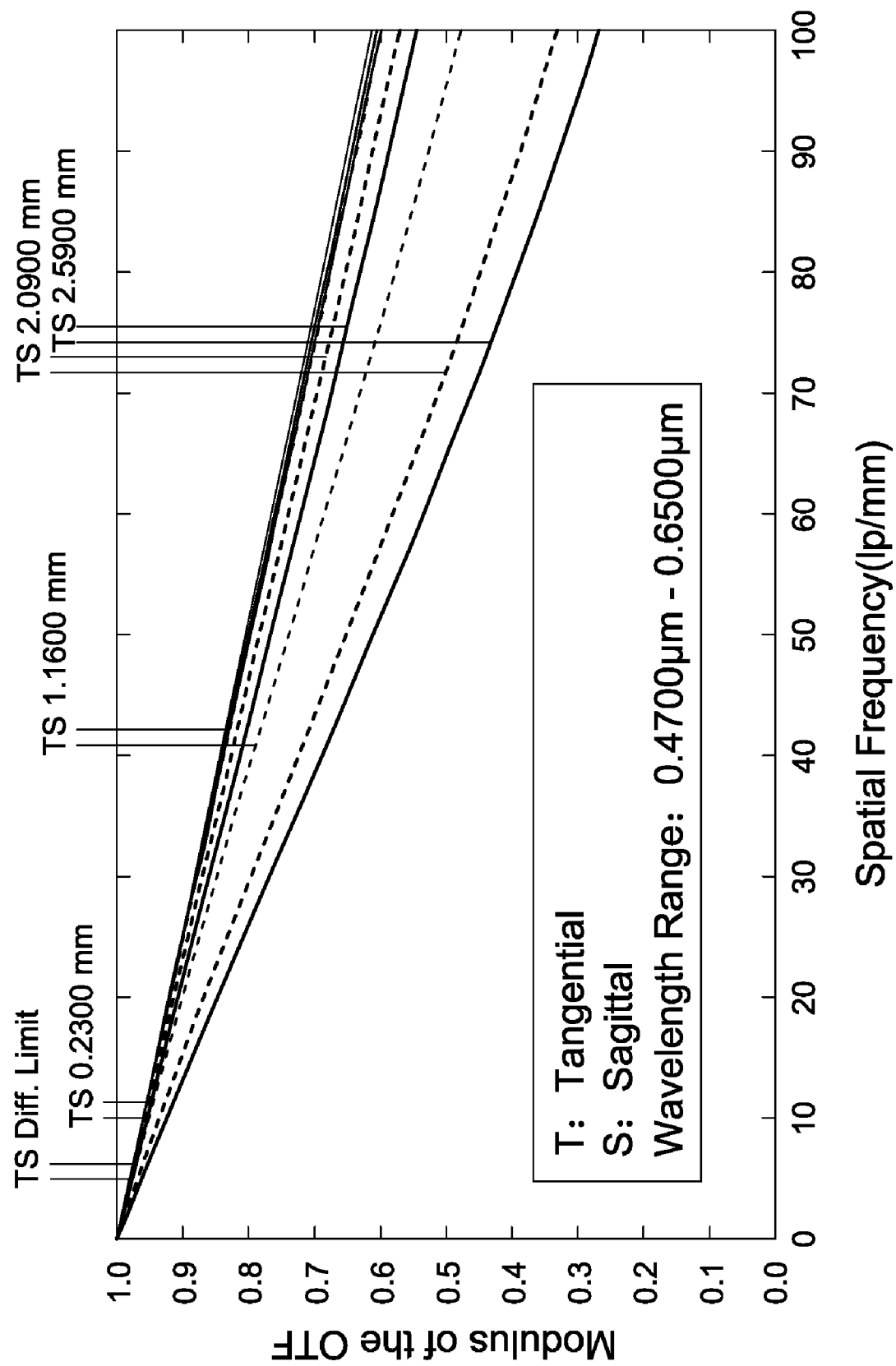
FIG. 5B is a modulation transfer function diagram of the camera device in Table 6 when F-number is equal to 5.45.
Figure 5C:
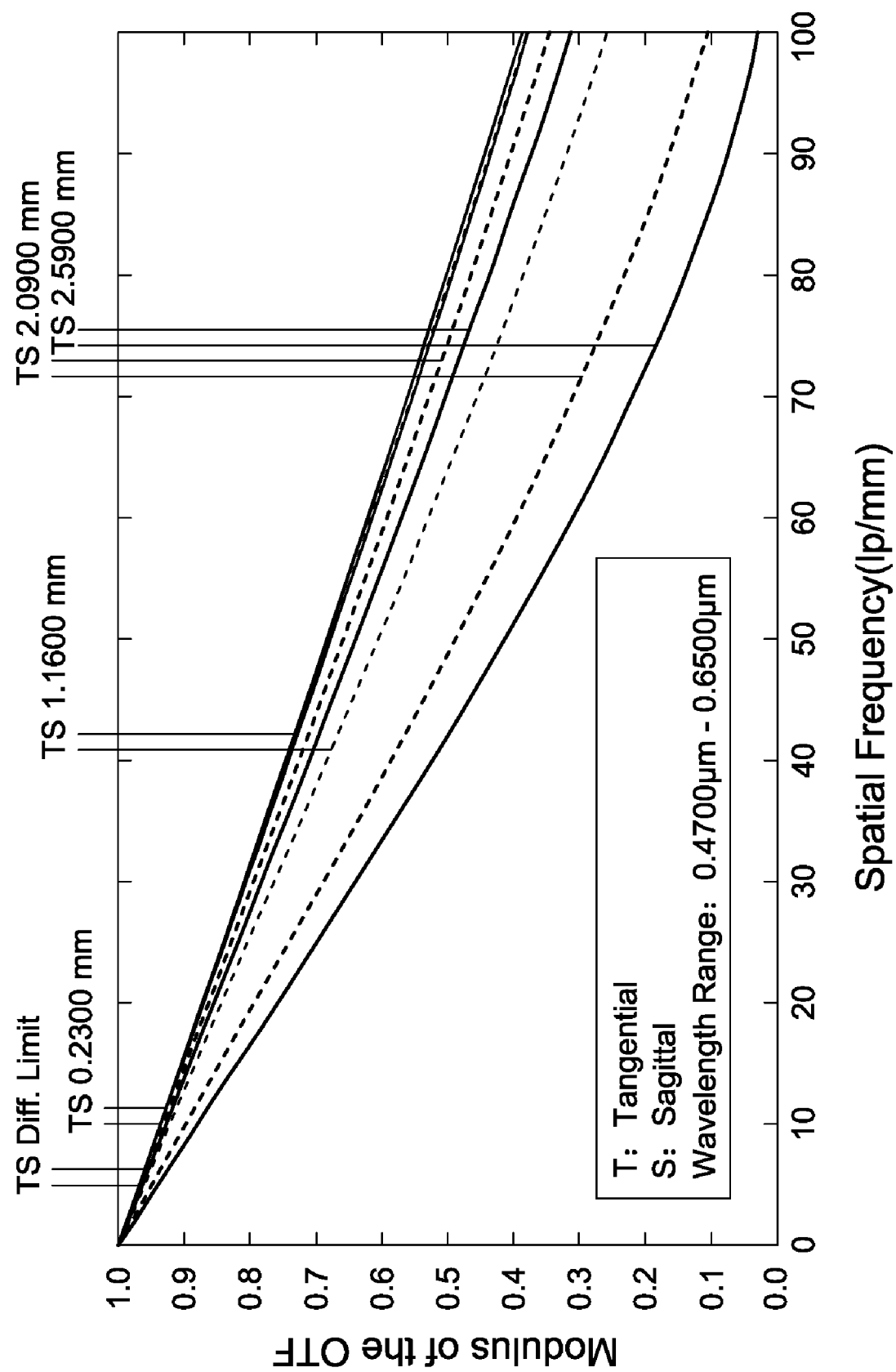
FIG. 5C is a modulation transfer function diagram of the camera device in Table 6 when F-number is equal to 8.85.

FIG. 5A shows the modulation transfer function diagram of the camera device in Table 6 when F-number is equal to 2.76. FIG. 5B shows the modulation transfer function diagram of the camera device in Table 6 when F-number is equal to 5.45. FIG. 5C shows the modulation transfer function diagram of the camera device in Table 6 when F-number is equal to 8.85.

Table 7 shows other data for the camera device of the second embodiment of the invention, wherein f is fixed to 5.09389 mm, D2x is fixed to 3.0872 mm, and $A2_x$ is fixed to 7.481681014 mm². If D2y ranges from 3.0872 mm to 0.112 mm, then F-number ranges from 1.68 to 8.86, D2x/D2y ranges from 1.0 to 27.56428751, (D2x−D2y)/(D2x/2) ranges from 0.0 to 1.927442343, ΔS2/(D2x/2) ranges from 0.216170649 mm to 4.678920066 mm, and $(A2_x-\Delta S2)/A2_x$ ranges from 0.955400262 to 0.034657987.

TABLE 7

Effective focal Length = 5.09389 mm
D2x = 3.0872 mm
$A2_x$ = 7.481681014 mm²

| D2y (mm) | D2x/D2y | (D2x − D2y)/ (D2x/2) | Hole Area (mm²) | Δ S2 (mm²) | Δ S2/(D2x/2) (mm) | $(A2_x - \Delta S2)/ A2_x$ | F-number |
|---|---|---|---|---|---|---|---|
| 3.0872 | 1.0 | 0.0 | 7.148 | 0.333681014 | 0.216170649 | 0.955400262 | 1.68 |
| 2.234 | 1.381915846 | 0.552733869 | 5.1726 | 2.309081014 | 1.495906332 | 0.69136869 | 1.98 |
| 1.11 | 2.781261261 | 1.280901788 | 2.57 | 4.911681014 | 3.181964897 | 0.34350569 | 2.81 |
| 0.744 | 4.149462366 | 1.518009847 | 1.722 | 5.759681014 | 3.731330017 | 0.230162178 | 3.43 |
| 0.56 | 5.512857143 | 1.637211713 | 1.296 | 6.185681014 | 4.00730825 | 0.173223103 | 3.96 |
| 0.44 | 7.016363636 | 1.71495206 | 1.018 | 6.463681014 | 4.187406721 | 0.136065678 | 4.47 |
| 0.372 | 8.298924731 | 1.759004924 | 0.861 | 6.620681014 | 4.289117009 | 0.115081089 | 4.86 |
| 0.32 | 9.6475 | 1.792692407 | 0.741 | 6.740681014 | 4.366857356 | 0.099041913 | 5.24 |
| 0.278 | 11.10503597 | 1.819901529 | 0.643 | 6.838681014 | 4.430345306 | 0.085943252 | 5.62 |
| 0.248 | 12.4483871 | 1.839336616 | 0.574 | 6.907681014 | 4.475046006 | 0.076720726 | 5.95 |
| 0.22 | 14.03272727 | 1.85747603 | 0.509 | 6.972681014 | 4.51715536 | 0.068032839 | 6.32 |
| 0.148 | 20.85945946 | 1.904120238 | 0.3426 | 7.139081014 | 4.624955309 | 0.045791848 | 7.71 |
| 0.112 | 27.56428571 | 1.927442343 | 0.2593 | 7.222381014 | 4.678920066 | 0.034657987 | 8.86 |

D2x: a maximum dimension of the hole 4031 through which the optical axis 50 passes
D2y: a minimum dimension of the hole 4031 through which the optical axis 50 passes
$A2_x$: an area of a circle having a diameter of D2x
Δ S2: a difference between the area of the circle having the diameter of D2x and a cross sectional area of the hole 4031

The modulation transfer function diagram of the camera device at different F-numbers in Table 7 is similar to in Table 6, so the illustration is omitted.

Figure 6:
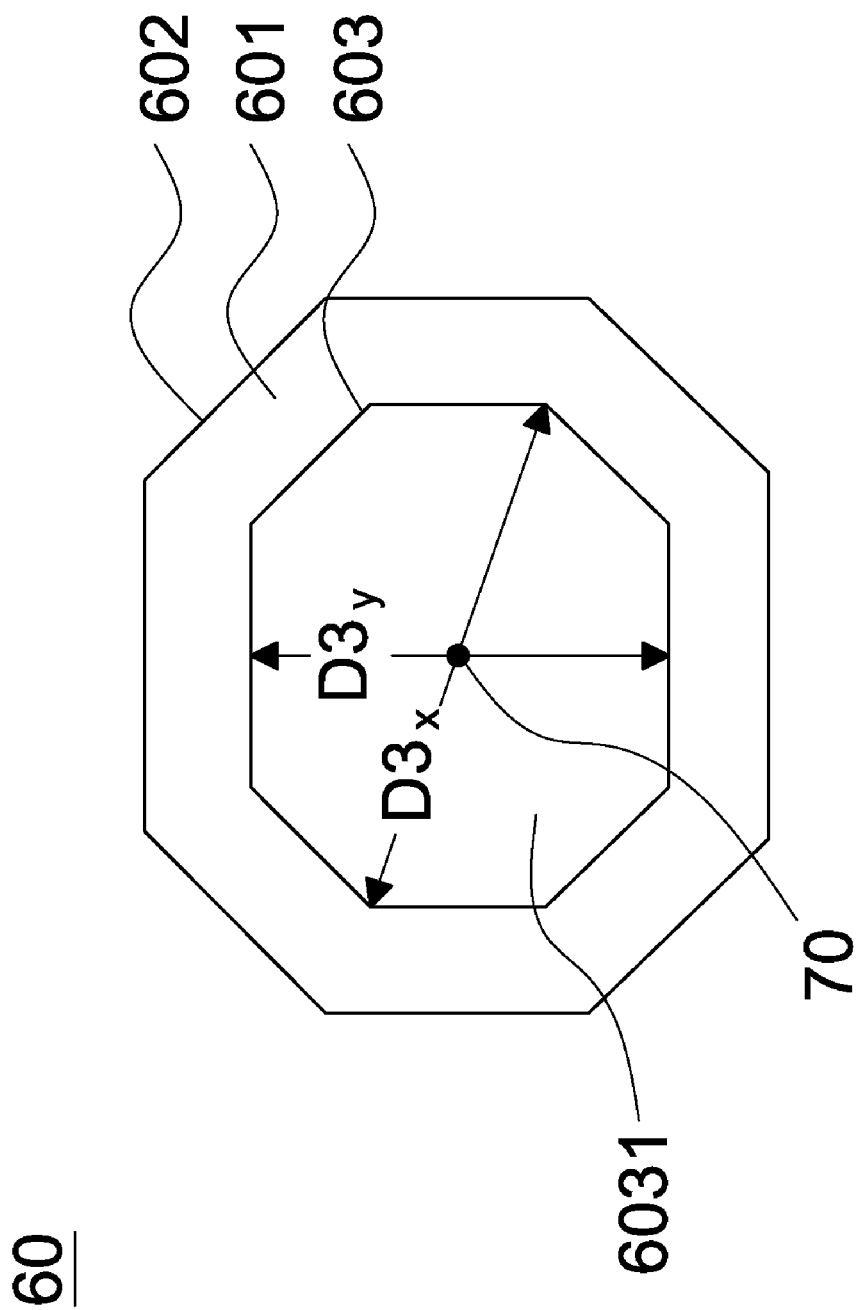
FIG. 6 is an annular body diagram of a camera device in accordance with a third embodiment of the invention.

As shown in FIG. 6, a camera device (not shown) in a third embodiment includes a plurality of lenses (not shown) and an annular body 60, which are arranged between an object side (not shown) and an image side (not shown) along an optical axis 70. The annular body 60 can be regarded as an annular shade, which will not be repeatedly emphasized hereinafter. The annular body 60 is disposed between the object side (not shown) and the plurality of lenses (not shown). The annular body 60 includes an annular main body 601, an outer circumferential portion 602, and an inner circumferential portion 603. The outer circumferential portion 602 and the inner circumferential portion 603 include eight straight edges respectively. The outer circumferential portion 602 is shaped to be non-circular for reduction of thickness of the camera device. The annular main body 601 connects to the outer circumferential portion 602 and the inner circumferential portion 603. The annular main body 601 is disposed between the outer circumferential portion 602 and the inner circumferential portion 603. The inner circumferential portion 603 is octagonal (non-circular) and surrounds the optical axis 70 to form a hole 6031. D3x is a maximum dimension of the hole 6031 defined by the inner circumferential portion 603 through which the optical axis 70 passes and D3y is a minimum dimension of the hole 6031 defined by the inner circumferential portion 603 through which the optical axis 70 passes. The hole 6031 allows the light rays from the object side (not shown) to pass through, and its dimension will affect the amount of the light rays passing through the camera device (not shown). Therefore, the main purpose of the annular body 60 is to work as an aperture. When the maximum dimension D3x of the hole 6031 is fixed, the annular body 60 will be flatter if the minimum dimension D3y which is smaller than the maximum dimension D3x is reduced. Therefore, if the flattened annular body 60 is included in a general lens assembly or a periscopic lens assembly, then the thickness of the lens assembly can be effectively reduced. The above camera device (not shown) may further includes a reflection device disposed between the object side (not shown) and the plurality of lenses (not shown), wherein the reflection device may be a prism or a reflection mirror. The reflection device is used for changing an optical path along which light from a subject is directed through lenses to an imaging element. When the additional reflection device is introduced into a camera device, the total track length (TTL), the effective focal length (EFL), the back focal length (BFL) and other optical parameters of the camera device are significantly influenced so that re-optimization of the entire optical architecture, re-arrangement of optical elements, and precision adjustment are required. The location arrangement of the reflection device makes the design of the mechanical configuration more flexible than conventional design such as disposed between the lenses, and can be adjusted according to the requirements.

Table 8 shows data for the camera device of the third embodiment of the invention, wherein f is fixed to 15 mm, D3x is fixed to 5.55 mm, and $A3_x$ is fixed to 24.1799625 mm², f is an effective focal length of the camera device (not shown), D3x is a maximum dimension of the hole 6031 defined by the inner circumferential portion 603 through which the optical axis 70 passes, D3y is a minimum dimension of the hole 6031 defined by the inner circumferential portion 603 through which the optical axis 70 passes, $A3_x$ is an area of a circle having a diameter of D3x and ΔS3 is a difference between the area of the circle having the diameter of D3x and a cross sectional area of the hole 6031. If D3y ranges from 5.55 mm to 0.5 mm, then F-number ranges from 2.71 to 8.53, D3x/D3y ranges from 1.0 to 11.1, (D3x−D3y)/(D3x/2) ranges from 0.0 to 1.81981982, ΔS3/(D3x/2) ranges from 0.065103604 mm to 7.840346847 mm, and $(A3_x-ΔS3)/A3_x$ ranges from 0.992528421 to 0.100206938.

TABLE 8

Effective focal Length = 15 mm
D3x = 5.55 mm
$A3_x$ = 24.1799625 mm²

| D3y (mm) | D3x/D3y | (D3x − D3y)/(D3x/2) | Hole Area (mm²) | Δ S3 (mm²) | Δ S3/(D3x/2) (mm) | $(A3_x - ΔS3)/A3_x$ | F-number |
|---|---|---|---|---|---|---|---|
| 5.55 | 1.0 | 0.0 | 23.9993 | 0.1806625 | 0.065103604 | 0.992528421 | 2.71 |
| 5 | 1.11 | 0.198198198 | 22.5084 | 1.6715625 | 0.602364865 | 0.93086993 | 2.80 |
| 4.44 | 1.25 | 0.4 | 20.7599 | 3.4200625 | 1.232454955 | 0.85855799 | 2.91 |
| 4 | 1.3875 | 0.558558559 | 19.2229 | 4.9570625 | 1.786328829 | 0.794992962 | 3.03 |
| 2 | 2.775 | 1.279279279 | 9.418 | 14.7619625 | 5.319626126 | 0.389496055 | 4.33 |
| 1.33 | 4.172932331 | 1.520720721 | 6.367 | 17.8129625 | 6.419085586 | 0.263317199 | 5.26 |
| 1 | 5.55 | 1.63963964 | 4.852 | 19.3279625 | 6.965031532 | 0.200662015 | 6.03 |
| 0.8 | 6.9375 | 1.711711712 | 3.871 | 20.3089625 | 7.318545045 | 0.160091233 | 6.75 |
| 0.67 | 8.28358209 | 1.758558559 | 3.244 | 20.9359625 | 7.544490991 | 0.134160671 | 7.37 |
| 0.57 | 9.736842105 | 1.794594595 | 2.739 | 21.4409625 | 7.726472973 | 0.11327561 | 8.03 |
| 0.5 | 11.1 | 1.81981982 | 2.423 | 21.7569625 | 7.840346847 | 0.100206938 | 8.53 |

D3x: a maximum dimension of the hole 6031 through which the optical axis 70 passes
D3y: a minimum dimension of the hole 6031 through which the optical axis 70 passes
$A3_x$: an area of a circle having a diameter of D3x
Δ S3: a difference between the area of the circle having the diameter of D3x and a cross sectional area of the hole 6031

Figure 7B:
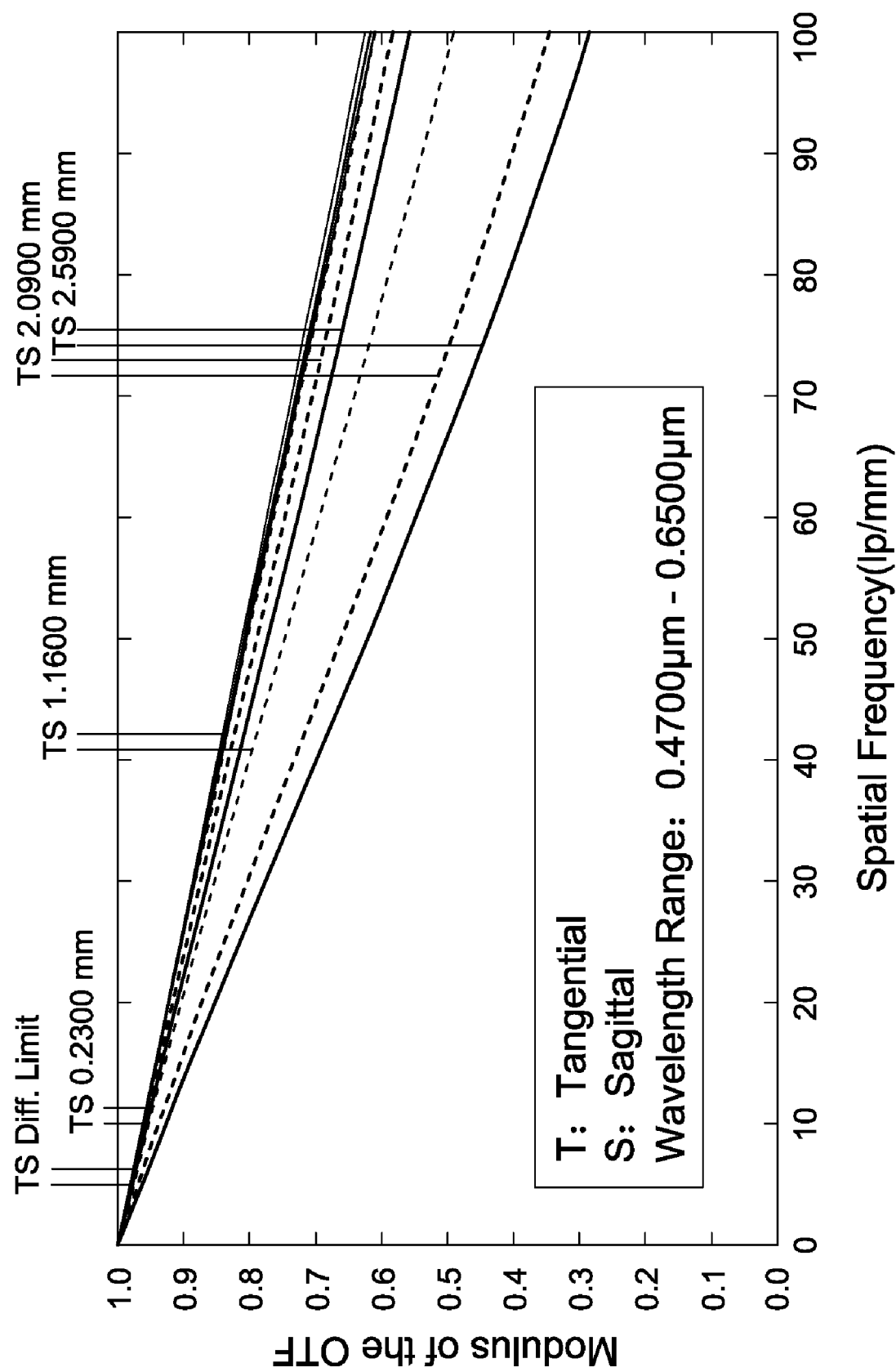
FIG. 7B is a modulation transfer function diagram of the camera device in Table 8 when F-number is equal to 5.26.
Figure 7C:
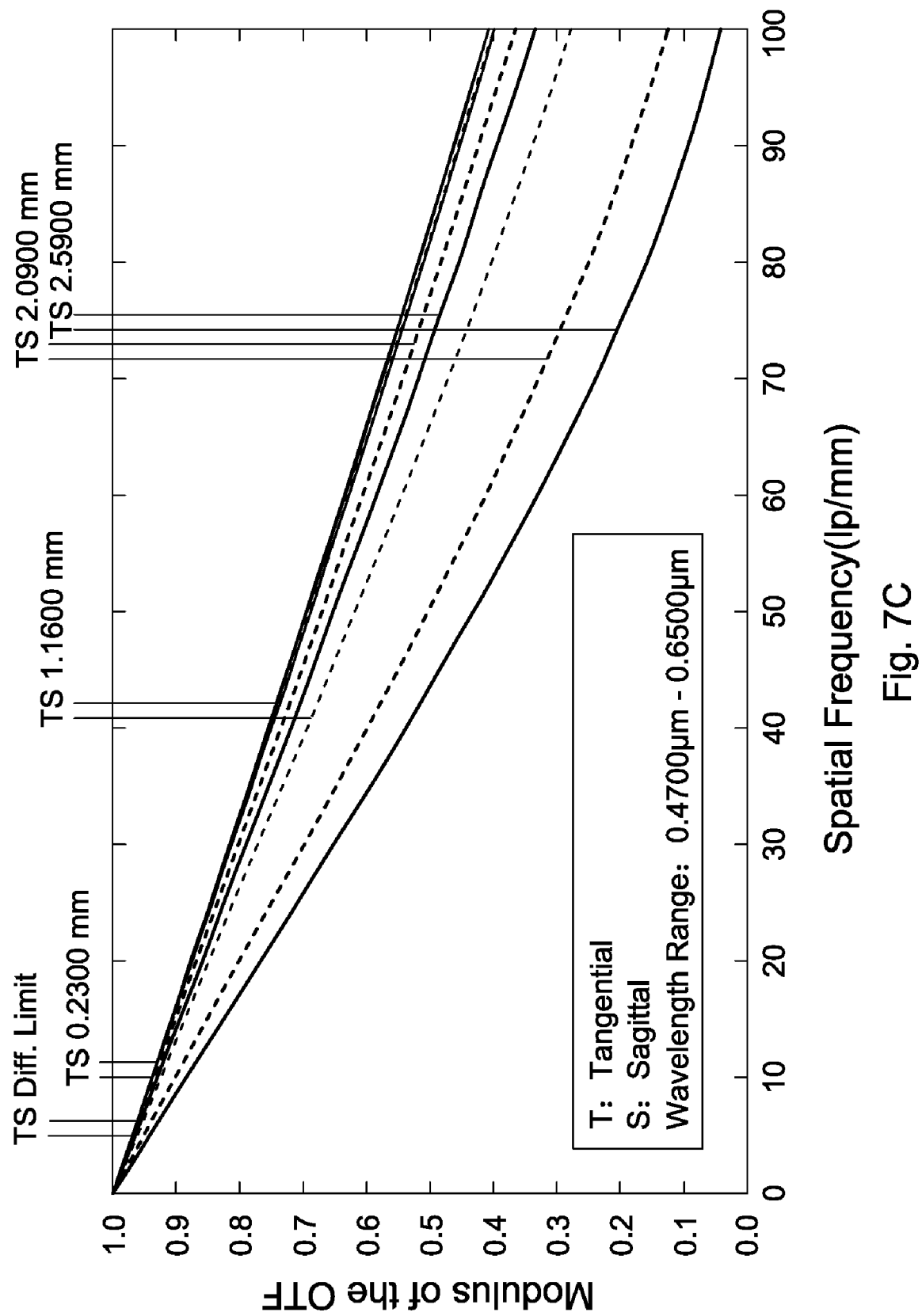
FIG. 7C is a modulation transfer function diagram of the camera device in Table 8 when F-number is equal to 8.53.

FIG. 7A shows the modulation transfer function diagram of the camera device in Table 8 when F-number is equal to 2.71. FIG. 7B shows the modulation transfer function diagram of the camera device in Table 8 when F-number is equal to 5.26. FIG. 7C shows the modulation transfer function diagram of the camera device in Table 8 when F-number is equal to 8.53.

Table 9 shows other data for the camera device of the third embodiment of the invention, wherein f is fixed to 5.09389 mm, D3x is fixed to 3.0872 mm, and $A3_x$ is fixed to 7.481681014 mm². If D3y ranges from 3.0872 mm to 0.112 mm, then F-number ranges from 1.67 to 8.28, D3x/D3y ranges from 1.0 to 27.56428571, (D3x−D3y)/(D3x/2) ranges from 0.0 to 1.927442343, ΔS3/(D3x/2) ranges from 0.133247612 mm to 4.654496641 mm, and $(A3_x-ΔS3)/A3_x$ ranges from 0.972508716 to 0.039696961.

TABLE 9

Effective focal Length = 5.09389 mm
D3x = 3.0872 mm
$A3_x$ =7.481681014 mm²

| D3y (mm) | D3x/D3y | (D3x − D3y)/(D3x/2) | Hole Area (mm²) | Δ S3 (mm²) | Δ S3/(D3x/2) (mm) | $(A3_x - Δ S3)/A3_x$ | F-number |
|---|---|---|---|---|---|---|---|
| 3.0872 | 1.0 | 0.0 | 7.276 | 0.205681014 | 0.133247612 | 0.972508716 | 1.67 |
| 2.234 | 1.381915846 | 0.552733869 | 5.952 | 1.529681014 | 0.990982777 | 0.795543139 | 1.84 |
| 1.11 | 2.781261261 | 1.280901788 | 2.816 | 4.665681014 | 3.022597185 | 0.376386001 | 2.68 |
| 0.744 | 4.149462366 | 1.518009847 | 1.953 | 5.528681014 | 3.581679849 | 0.261037593 | 3.22 |
| 0.56 | 5.512857143 | 1.637211713 | 1.469 | 6.012681014 | 3.895232583 | 0.196346249 | 3.72 |
| 0.44 | 7.016363636 | 1.71495206 | 1.137 | 6.344681014 | 4.11031421 | 0.151971194 | 4.23 |

TABLE 9-continued

| | | | | | | | |
|---|---|---|---|---|---|---|---|
| 0.372 | 8.298924731 | 1.759004924 | 0.936 | 6.545681014 | 4.240529292 | 0.125105574 | 4.66 |
| 0.32 | 9.6475 | 1.792692407 | 0.824 | 6.657681014 | 4.313086949 | 0.110135677 | 4.97 |
| 0.278 | 11.10503597 | 1.819901529 | 0.715 | 6.766681014 | 4.383701098 | 0.095566758 | 5.33 |
| 0.248 | 12.4483871 | 1.839336616 | 0.6342 | 6.847481014 | 4.436046265 | 0.084767046 | 5.66 |
| 0.22 | 14.03272727 | 1.85747603 | 0.5582 | 6.923481014 | 4.485281818 | 0.074608901 | 6.04 |
| 0.148 | 20.85945946 | 1.904120238 | 0.388 | 7.093681014 | 4.595543544 | 0.051860003 | 7.24 |
| 0.112 | 27.56428571 | 1.927442343 | 0.297 | 7.184681014 | 4.654496641 | 0.039696961 | 8.28 |

D3x: a maximum dimension of the hole 6031 through which the optical axis 70 passes
D3y: a minimum dimension of the hole 6031 through which the optical axis 70 passes
A3$_x$: an area of a circle having a diameter of D3x
Δ S3: a difference between the area of the circle having the diameter of D3x and a cross sectional area of the hole 6031

The modulation transfer function diagram of the camera device at different F-numbers in Table 9 is similar to in Table 8, so the illustration is omitted.

In each of the above embodiments, the annular body can be made of metal, polyethylene terephthalate (PET), or manufactured by atomizing, blacking or printing a non-effective-diameter region on any of the lenses.

In each of the above embodiments, the annular body is disposed between the object side and the plurality of lenses. However, it has the same effect and falls into the scope of the invention that the annular body is disposed between the plurality of lenses or between the plurality of lenses and the image side.

In the first embodiment, the outer circumferential portion 202 and the inner circumferential portion 203 of FIG. 2A are similar in shape. When the shape and the dimension of the inner circumferential portion 203 are fixed, the dimension of the outer circumferential portion 202 can be arbitrarily adjusted, which means that the interval between the outer circumferential portion 202 and the inner circumferential portion 203 may be any values greater than 0 without affecting the optical properties of the camera device so that the structural strength of the annular body is sufficient and the size of the camera device can be reduced, and should be within the scope of the invention.

In the third embodiment, the outer circumferential portion 602 and the inner circumferential portion 603 of FIG. 6 are similar in shape. When the shape and the dimension of the inner circumferential portion 603 are fixed, the dimension of the outer circumferential portion 602 can be arbitrarily adjusted, which means that the interval between the outer circumferential portion 602 and the inner circumferential portion 603 may be any values greater than 0 without affecting the optical properties of the camera device so that the structural strength of the annular body is sufficient and the size of the camera device can be reduced, and should be within the scope of the invention.

In the second embodiment, the outer circumferential portion 402 and the inner circumferential portion 403 of FIG. 4 are different in shape. A horizontal interval Dh and a vertical interval Dv are defined between the outer circumferential portion 402 and the inner circumferential portion 403. When the shape and dimension of the inner circumferential portion 403 are fixed, the dimension of the outer circumferential portion 402 can be adjusted, which means that the horizontal interval Dh and the vertical interval Dv may be any values greater than 0, and the optical properties of the camera device are not affected. During the adjustment of the vertical interval Dv, a preferred vertical interval of the outer circumferential portion 402 is between 0.112 mm and 5.55 mm, and at this time of the adjustment of the horizontal interval Dh, the ratio of the preferred horizontal interval to the preferred vertical interval is between 1.1 and 27.6, so that the structural strength of the annular body is sufficient and the size of the camera device can be reduced, which should be within the scope of the invention In the above embodiments, it is also possible to connect the annual body to any of the lenses of the plurality of lenses, so that any of the lenses of the plurality of lenses includes the annular body, and should be within the scope of the invention. The appearance of the annular body is in a non-circular shape, so that the other components of the lens assembly of the camera device such as lenses, lens barrel, etc., are also required to be modified into a non-circular shape in order to maintain good optical performance and reduce the thickness of the camera device at the same time. When the annular body is used in a lens assembly of the camera device, the size and volume of the lens assembly of the camera device can be significantly reduced and still maintain good optical performance.

Referring to the description and calculation method as paragraphs [0056]-[40058], the data from Tables 6-9 can be used to calculate the data in the column "Radius of circular annular body (mm)", "Dy of circular annular body (mm)", "Size Reduction (mm)", and "Reduction Rate (%)" of Tables 10A to 13A shown below. The data in Tables 10A to 13A can again prove that the thickness of the camera device with non-circular annular body is significantly smaller than that of the camera device with circular annular body under the same F-number that can maintain good optical performance at the same time.

Furthermore, through the same calculation method as paragraph [0060], the data from Tables 6-9 can be used to calculate the data in the column "Diameter of Circular Hole (mm)" and "EFL of the Same F-number with a Circular Hole (mm)" of Tables 10B to 13B shown below. The data in the column "EFL of the Same F-number with a Circular Hole (mm)" of Tables 10B to 13B can again prove that under the condition of the same F-number value, a camera device with non-circular annular body has an EFL significantly smaller than that of the camera device with fixed circular annular body.

It is therefore understood that the present invention is able to effectively reduce the thickness of the camera device, maintain good optical performance of the camera device, and provide the camera device with a smaller EFL.

TABLE 10A

Effective focal Length = 15 mm
D2x = 5.55 mm
$A2_x$ = 24.1799625 mm$^2$

| D2y (mm) | D2x/D2y | (D2x − D2y)/(D2x/2) | Hole Area (mm$^2$) | Δ S2 (mm$^2$) | Δ S2/(D2x/2) (mm) | ($A2_x$ − Δ S2)/$A2_x$ | F-number | Radius of circular annular body (mm) | Dy of circular annular body (mm) | Size Reduction (mm) | Reduction Rate (%) |
|---|---|---|---|---|---|---|---|---|---|---|---|
| 5.55 | 1 | 0 | 24.1799625 | 0 | 0 | 1 | 2.76 | 2.77 | 5.55 | 0 | 0 |
| 5 | 1.11 | 0.198198198 | 21.5 | 2.6799625 | 0.965752252 | 0.889165978 | 2.86 | 2.62 | 5.23 | 0.23 | 4.44 |
| 4.44 | 1.25 | 0.4 | 19.7136 | 4.4663625 | 1.6095 | 0.815286624 | 2.99 | 2.51 | 5.01 | 0.57 | 11.38 |
| 4 | 1.3875 | 0.558558559 | 18.2 | 5.9799625 | 2.154941441 | 0.752689339 | 3.11 | 2.41 | 4.81 | 0.81 | 16.91 |
| 2 | 2.775 | 1.279279279 | 9.103 | 15.0769625 | 5.43313964 | 0.376468739 | 4.40 | 1.70 | 3.40 | 1.40 | 41.25 |
| 1.33 | 4.172932331 | 1.520720721 | 5.935 | 18.2449625 | 6.574761261 | 0.245451166 | 5.45 | 1.37 | 2.75 | 1.42 | 51.62 |
| 1 | 5.55 | 1.63963964 | 4.5224 | 19.6575625 | 7.083806306 | 0.187030894 | 6.24 | 1.20 | 2.40 | 1.40 | 58.33 |
| 0.8 | 6.9375 | 1.711711712 | 3.6945 | 20.4854625 | 7.382148649 | 0.1527918 | 6.91 | 1.08 | 2.17 | 1.37 | 63.11 |
| 0.67 | 8.28358209 | 1.758558559 | 2.9813 | 21.1986625 | 7.639157658 | 0.123296304 | 7.69 | 0.97 | 1.95 | 1.28 | 65.61 |
| 0.57 | 9.736842105 | 1.794594595 | 2.576 | 21.6039625 | 7.785211712 | 0.106534491 | 8.28 | 0.91 | 1.81 | 1.24 | 68.53 |
| 0.5 | 11.1 | 1.81981982 | 2.251 | 21.9289625 | 7.902328829 | 0.09309361 | 8.85 | 0.85 | 1.69 | 1.19 | 70.47 |

TABLE 10B

D2x = 5.55 mm
$A2_x$ = 24.1799625 mm$^2$

| D2y (mm) | D2x/D2y | (D2x − D2y)/(D2x/2) | Hole Area (mm$^2$) | Δ S2 (mm$^2$) | Δ S2/(D2x/2) (mm) | ($A2_x$ − Δ S2)/$A2_x$ | F-number | EFL (mm) | Diameter of Circular Hole (mm) | EFL of the Same F-number with a Circular Hole (mm) |
|---|---|---|---|---|---|---|---|---|---|---|
| 5.55 | 1 | 0 | 24.1799625 | 0 | 0 | 1 | 2.76 | 15 | 5.55 | 15.32 |
| 5 | 1.11 | 0.198198198 | 21.5 | 2.6799625 | 0.965752252 | 0.889165978 | 2.86 | 15 | 5.55 | 15.87 |
| 4.44 | 1.25 | 0.4 | 19.7136 | 4.4663625 | 1.6095 | 0.815286624 | 2.99 | 15 | 5.55 | 16.59 |
| 4 | 1.3875 | 0.558558559 | 18.2 | 5.9799625 | 2.154941441 | 0.752689339 | 3.11 | 15 | 5.55 | 17.26 |
| 2 | 2.775 | 1.279279279 | 9.103 | 15.0769625 | 5.43313964 | 0.376468739 | 4.40 | 15 | 5.55 | 24.42 |
| 1.33 | 4.172932331 | 1.520720721 | 5.935 | 18.2449625 | 6.574761261 | 0.245451166 | 5.45 | 15 | 5.55 | 30.25 |
| 1 | 5.55 | 1.63963964 | 4.5224 | 19.6575625 | 7.083806306 | 0.187030894 | 6.24 | 15 | 5.55 | 34.63 |
| 0.8 | 6.9375 | 1.711711712 | 3.6945 | 20.4854625 | 7.382148649 | 0.1527918 | 6.91 | 15 | 5.55 | 38.35 |
| 0.67 | 8.28358209 | 1.758558559 | 2.9813 | 21.1986625 | 7.639157658 | 0.123296304 | 7.69 | 15 | 5.55 | 42.68 |
| 0.57 | 9.736842105 | 1.794594595 | 2.576 | 21.6039625 | 7.785211712 | 0.106534491 | 8.28 | 15 | 5.55 | 45.95 |
| 0.5 | 11.1 | 1.81981982 | 2.251 | 21.9289625 | 7.902328829 | 0.09309361 | 8.85 | 15 | 5.55 | 49.12 |

TABLE 11A

Effective focal Length = 5.09389 mm
D2x = 3.0872 mm
$A2_x$ = 7.481681014 mm$^2$

| D2y (mm) | D2x/D2y | (D2x − D2y)/(D2x/2) | Hole Area (mm$^2$) | Δ S2 (mm$^2$) | Δ S2/(D2x/2) (mm) | ($A2_x$ − Δ S2)/$A2_x$ | F-number | Radius of circular annular body (mm) | Dy of circular annular body (mm) | Size Reduction (mm) | Reduction Rate (%) |
|---|---|---|---|---|---|---|---|---|---|---|---|
| 3.0872 | 1 | 0 | 7.481681014 | 0 | 0 | 1 | 1.68 | 1.54 | 3.09 | 0 | 0 |
| 2.234 | 1.381915846 | 0.552733869 | 5.1726 | 2.309081014 | 1.495906332 | 0.69136869 | 1.98 | 1.28 | 2.57 | 0.33 | 12.95 |
| 1.11 | 2.781261261 | 1.280901788 | 2.57 | 4.911681014 | 3.181964897 | 0.34350569 | 2.81 | 0.90 | 1.81 | 0.70 | 38.64 |
| 0.744 | 4.149462366 | 1.518009847 | 1.722 | 5.759681014 | 3.731330017 | 0.230162178 | 3.43 | 0.74 | 1.48 | 0.74 | 49.75 |
| 0.56 | 5.512857143 | 1.637211713 | 1.296 | 6.185681014 | 4.00730825 | 0.173223103 | 3.96 | 0.64 | 1.28 | 0.72 | 56.41 |
| 0.44 | 7.016363636 | 1.71495206 | 1.018 | 6.463681014 | 4.187406721 | 0.136065678 | 4.47 | 0.57 | 1.14 | 0.70 | 61.35 |
| 0.372 | 8.298924731 | 1.759004924 | 0.861 | 6.620681014 | 4.289117009 | 0.115081089 | 4.86 | 0.52 | 1.05 | 0.68 | 64.47 |
| 0.32 | 9.6475 | 1.792692407 | 0.741 | 6.740681014 | 4.366857356 | 0.099041913 | 5.24 | 0.49 | 0.97 | 0.65 | 67.06 |
| 0.278 | 11.10503597 | 1.819901529 | 0.643 | 6.838681014 | 4.430345306 | 0.085943252 | 5.62 | 0.45 | 0.90 | 0.63 | 69.28 |
| 0.248 | 12.4483871 | 1.839336616 | 0.574 | 6.907681014 | 4.475046006 | 0.076720726 | 5.95 | 0.43 | 0.85 | 0.61 | 70.99 |
| 0.22 | 14.03272727 | 1.85747603 | 0.509 | 6.972681014 | 4.51715536 | 0.068032839 | 6.32 | 0.40 | 0.81 | 0.59 | 72.67 |

TABLE 11A-continued

| | | | | | | | | | | |
|---|---|---|---|---|---|---|---|---|---|---|
| 0.148 | 20.85945946 | 1.904120238 | 0.3426 | 7.139081014 | 4.624955309 | 0.045791848 | 7.71 | 0.33 | 0.66 | 0.51 | 77.59 |
| 0.112 | 27.56428571 | 1.927442343 | 0.2593 | 7.222381014 | 4.678920066 | 0.034657987 | 8.86 | 0.29 | 0.57 | 0.46 | 80.51 |

TABLE 11B

D2x = 3.0872 mm
$A2_x$ = 7.481681014 mm$^2$

| D2y (mm) | D2x/D2y | (D2x − D2y)/ (D2x/2) | Hole Area (mm$^2$) | Δ S2 (mm$^2$) | Δ S2/(D2x/2) (mm) | ($A2_x$ − Δ S2)/ $A2_x$ | F-number | EFL (mm) | Diameter of Circular Hole (mm) | EFL of the Same F-number with a Circular Hole (mm) |
|---|---|---|---|---|---|---|---|---|---|---|
| 3.0872 | 1 | 0 | 7.481681014 | 0 | 0 | 1 | 1.68 | 5.09 | 3.09 | 5.19 |
| 2.234 | 1.381915846 | 0.552733869 | 5.1726 | 2.309081014 | 1.495906332 | 0.69136869 | 1.98 | 5.09 | 3.09 | 6.11 |
| 1.11 | 2.781261261 | 1.280901788 | 2.57 | 4.911681014 | 3.181964897 | 0.34350569 | 2.81 | 5.09 | 3.09 | 8.68 |
| 0.744 | 4.149462366 | 1.518009847 | 1.722 | 5.759681014 | 3.731330017 | 0.230162178 | 3.43 | 5.09 | 3.09 | 10.59 |
| 0.56 | 5.512857143 | 1.637211713 | 1.296 | 6.185681014 | 4.00730825 | 0.173223103 | 3.96 | 5.09 | 3.09 | 12.22 |
| 0.44 | 7.016363636 | 1.71495206 | 1.018 | 6.463681014 | 4.187406721 | 0.136065678 | 4.47 | 5.09 | 3.09 | 13.80 |
| 0.372 | 8.298924731 | 1.759004924 | 0.861 | 6.620681014 | 4.289117009 | 0.115081089 | 4.86 | 5.09 | 3.09 | 15.00 |
| 0.32 | 9.6475 | 1.792692407 | 0.741 | 6.740681014 | 4.366857356 | 0.099041913 | 5.24 | 5.09 | 3.09 | 16.18 |
| 0.278 | 11.10503597 | 1.819901529 | 0.643 | 6.838681014 | 4.430345306 | 0.085943252 | 5.62 | 5.09 | 3.09 | 17.35 |
| 0.248 | 12.4483871 | 1.839336616 | 0.574 | 6.907681014 | 4.475046006 | 0.076720726 | 5.95 | 5.09 | 3.09 | 18.37 |
| 0.22 | 14.03272727 | 1.85747603 | 0.509 | 6.972681014 | 4.51715536 | 0.068032839 | 6.32 | 5.09 | 3.09 | 19.51 |
| 0.148 | 20.85945946 | 1.904120238 | 0.3426 | 7.139081014 | 4.624955309 | 0.045791848 | 7.71 | 5.09 | 3.09 | 23.80 |
| 0.112 | 27.56428571 | 1.927442343 | 0.2593 | 7.222381014 | 4.678920066 | 0.034657987 | 8.86 | 5.09 | 3.09 | 27.35 |

TABLE 12A

Effective focal Length = 15 mm
D3x = 5.55 mm
$A3_x$ = 24.1799625 mm$^2$

| D3y (mm) | D3x/D3y | (D3x − D3y)/ (D3x/2) | Hole Area (mm$^2$) | Δ S3 (mm$^2$) | Δ S3/(D3x/2) (mm) | ($A3_x$ − Δ S3)/ $A3_x$ | F-number | Radius of circular annular body (mm) | Dy of circular annular body (mm) | Size Reduction (mm) | Reduction Rate (%) |
|---|---|---|---|---|---|---|---|---|---|---|---|
| 5.55 | 1 | 0 | 24.1799625 | 0 | 0 | 1 | 2.71 | 2.77 | 5.55 | 0 | 0 |
| 5 | 1.11 | 0.198198198 | 22.5084 | 1.6715625 | 0.602364865 | 0.93086993 | 2.80 | 2.68 | 5.35 | 0.35 | 6.60 |
| 4.44 | 1.25 | 0.4 | 20.7599 | 3.4200625 | 1.232454955 | 0.85855799 | 2.91 | 2.57 | 5.14 | 0.70 | 13.64 |
| 4 | 1.3875 | 0.558558559 | 19.2229 | 4.9570625 | 1.786328829 | 0.794992962 | 3.03 | 2.47 | 4.95 | 0.95 | 19.15 |
| 2 | 2.775 | 1.279279279 | 9.418 | 14.7619625 | 5.319626126 | 0.389496055 | 4.33 | 1.73 | 3.46 | 1.46 | 42.24 |
| 1.33 | 4.172932331 | 1.520720721 | 6.367 | 17.8129625 | 6.419085586 | 0.263317199 | 5.26 | 1.42 | 2.85 | 1.52 | 53.29 |
| 1 | 5.55 | 1.63963964 | 4.852 | 19.3279625 | 6.965031532 | 0.200662015 | 6.03 | 1.24 | 2.49 | 1.49 | 59.77 |
| 0.8 | 6.9375 | 1.711711712 | 3.871 | 20.3089625 | 7.318545045 | 0.160091233 | 6.75 | 1.11 | 2.22 | 1.42 | 63.97 |
| 0.67 | 8.28358209 | 1.758558559 | 3.244 | 20.9359625 | 7.544490991 | 0.134160671 | 7.37 | 1.01 | 2.03 | 1.36 | 67.03 |
| 0.57 | 9.736842105 | 1.794594595 | 2.739 | 21.4409625 | 7.726472973 | 0.11327561 | 8.03 | 0.93 | 1.87 | 1.30 | 69.48 |
| 0.5 | 11.1 | 1.81981982 | 2.423 | 21.7569625 | 7.840346847 | 0.100206938 | 8.53 | 0.88 | 1.76 | 1.26 | 71.53 |

TABLE 12B

D3x = 5.55 mm
$A3_x$ = 24.1799625 mm$^2$

| D3y (mm) | D3x/D3y | (D3x − D3y)/ (D3x/2) | Hole Area (mm$^2$) | Δ S3 (mm$^2$) | Δ S3/(D3x/2) (mm) | ($A3_x$ − Δ S3)/ $A3_x$ | F-number | EFL (mm) | Diameter of Circular Hole (mm) | EFL of the Same F-number with a Circular Hole (mm) |
|---|---|---|---|---|---|---|---|---|---|---|
| 5.55 | 1 | 0 | 24.1799625 | 0 | 0 | 1 | 2.71 | 15 | 5.55 | 15.04 |
| 5 | 1.11 | 0.198198198 | 22.5084 | 1.6715625 | 0.602364865 | 0.93086993 | 2.80 | 15 | 5.55 | 15.54 |

TABLE 12B-continued

| | | | | | | | | | | |
|---|---|---|---|---|---|---|---|---|---|---|
| 4.44 | 1.25 | 0.4 | 20.7599 | 3.4200625 | 1.232454955 | 0.85855799 | 2.91 | 15 | 5.55 | 16.15 |
| 4 | 1.3875 | 0.558558559 | 19.2229 | 4.9570625 | 1.786328829 | 0.794992962 | 3.03 | 15 | 5.55 | 16.82 |
| 2 | 2.775 | 1.279279279 | 9.418 | 14.7619625 | 5.319626126 | 0.389496055 | 4.33 | 15 | 5.55 | 24.03 |
| 1.33 | 4.172932331 | 1.520720721 | 6.367 | 17.8129625 | 6.419085586 | 0.263317199 | 5.26 | 15 | 5.55 | 29.19 |
| 1 | 5.55 | 1.63963964 | 4.852 | 19.3279625 | 6.965031532 | 0.200662015 | 6.03 | 15 | 5.55 | 33.47 |
| 0.8 | 6.9375 | 1.711711712 | 3.871 | 20.3089625 | 7.318545045 | 0.160091233 | 6.75 | 15 | 5.55 | 37.46 |
| 0.67 | 8.28358209 | 1.758558559 | 3.244 | 20.9359625 | 7.544490991 | 0.134160671 | 7.37 | 15 | 5.55 | 40.90 |
| 0.57 | 9.736842105 | 1.794594595 | 2.739 | 21.4409625 | 7.726472973 | 0.11327561 | 8.03 | 15 | 5.55 | 44.57 |
| 0.5 | 11.1 | 1.81981982 | 2.423 | 21.7569625 | 7.840346847 | 0.100206938 | 8.53 | 15 | 5.55 | 47.34 |

TABLE 13A

Effective focal Length = 5.09389 mm
D3x = 3.0872 mm
$A3_x$ = 7.481681014 mm²

| D3y (mm) | D3x/D3y | (D3x − D3y)/ (Dx/2) | Hole Area (mm²) | Δ S3 (mm²) | Δ S3/(D3x/2) (mm) | $(A3_x − ΔS3)/A3_x$ | F-number | Radius of circular annular body (mm) | Dy of circular annular body (mm) | Size Reduction (mm) | Reduction Rate (%) |
|---|---|---|---|---|---|---|---|---|---|---|---|
| 3.0872 | 1 | 0 | 7.481681014 | 0 | 0 | 1 | 1.67 | 1.54 | 3.09 | 0 | 0 |
| 2.234 | 1.381915846 | 0.552733869 | 5.952 | 1.529681014 | 0.990982777 | 0.795543139 | 1.84 | 1.38 | 2.75 | 0.52 | 18.85 |
| 1.11 | 2.781261261 | 1.280901788 | 2.816 | 4.665681014 | 3.022597185 | 0.376386001 | 2.68 | 0.95 | 1.89 | 0.78 | 41.38 |
| 0.744 | 4.149462366 | 1.518009847 | 1.953 | 5.528681014 | 3.581679849 | 0.261037593 | 3.22 | 0.79 | 1.58 | 0.83 | 52.82 |
| 0.56 | 5.512857143 | 1.637211713 | 1.469 | 6.012681014 | 3.895232583 | 0.196346249 | 3.72 | 0.68 | 1.37 | 0.81 | 59.05 |
| 0.44 | 7.016363636 | 1.71495206 | 1.137 | 6.344681014 | 4.11031421 | 0.151971194 | 4.23 | 0.60 | 1.20 | 0.76 | 63.43 |
| 0.372 | 8.298924731 | 1.759004924 | 0.936 | 6.545681014 | 4.240529292 | 0.125105574 | 4.66 | 0.55 | 1.09 | 0.72 | 65.92 |
| 0.32 | 9.6475 | 1.792692407 | 0.824 | 6.657681014 | 4.313086949 | 0.110135677 | 4.97 | 0.51 | 1.02 | 0.70 | 68.76 |
| 0.278 | 11.10503597 | 1.819901529 | 0.715 | 6.766681014 | 4.383701098 | 0.095566758 | 5.33 | 0.478 | 0.95 | 0.68 | 70.86 |
| 0.248 | 12.4483871 | 1.839336616 | 0.6342 | 6.847481014 | 4.436046265 | 0.084767046 | 5.66 | 0.45 | 0.90 | 0.65 | 72.40 |
| 0.22 | 14.03272727 | 1.85747603 | 0.5582 | 6.923481014 | 4.485281818 | 0.074608901 | 6.04 | 0.42 | 0.84 | 0.62 | 73.90 |
| 0.148 | 20.85945946 | 1.904120238 | 0.388 | 7.093681014 | 4.595543544 | 0.051860003 | 7.24 | 0.35 | 0.70 | 0.55 | 78.94 |
| 0.112 | 27.56428571 | 1.927442343 | 0.297 | 7.184681014 | 4.654496641 | 0.039696961 | 8.28 | 0.31 | 0.61 | 0.50 | 81.79 |

TABLE 13B

D3x = 3.0872 mm
$A3_x$ = 7.481681014 mm²

| D3y (mm) | D3x/D3y | (D3x − D3y)/ (Dx/2) | Hole Area (mm²) | Δ S3 (mm²) | Δ S3/(D3x/2) (mm) | $(A3_x − ΔS3)/A3_x$ | F-number | EFL (mm) | Diameter of Circular Hole (mm) | EFL of the Same F-number with a Circular Hole (mm) |
|---|---|---|---|---|---|---|---|---|---|---|
| 3.0872 | 1 | 0 | 7.481681014 | 0 | 0 | 1 | 1.67 | 5.09 | 3.09 | 5.16 |
| 2.234 | 1.381915846 | 0.552733869 | 5.952 | 1.529681014 | 0.990982777 | 0.795543139 | 1.84 | 5.09 | 3.09 | 5.68 |
| 1.11 | 2.781261261 | 1.280901788 | 2.816 | 4.665681014 | 3.022597185 | 0.376386001 | 2.68 | 5.09 | 3.09 | 8.27 |
| 0.744 | 4.149462366 | 1.518009847 | 1.953 | 5.528681014 | 3.581679849 | 0.261037593 | 3.22 | 5.09 | 3.09 | 9.94 |
| 0.56 | 5.512857143 | 1.637211713 | 1.469 | 6.012681014 | 3.895232583 | 0.196346249 | 3.72 | 5.09 | 3.09 | 11.48 |
| 0.44 | 7.016363636 | 1.71495206 | 1.137 | 6.344681014 | 4.11031421 | 0.151971194 | 4.23 | 5.09 | 3.09 | 13.06 |
| 0.372 | 8.298924731 | 1.759004924 | 0.936 | 6.545681014 | 4.240529292 | 0.125105574 | 4.66 | 5.09 | 3.09 | 14.39 |
| 0.32 | 9.6475 | 1.792692407 | 0.824 | 6.657681014 | 4.313086949 | 0.110135677 | 4.97 | 5.09 | 3.09 | 15.34 |
| 0.278 | 11.10503597 | 1.819901529 | 0.715 | 6.766681014 | 4.383701098 | 0.095566758 | 5.33 | 5.09 | 3.09 | 16.45 |
| 0.248 | 12.4483871 | 1.839336616 | 0.6342 | 6.847481014 | 4.436046265 | 0.084767046 | 5.66 | 5.09 | 3.09 | 17.47 |
| 0.22 | 14.03272727 | 1.85747603 | 0.5582 | 6.923481014 | 4.485281818 | 0.074608901 | 6.04 | 5.09 | 3.09 | 18.65 |
| 0.148 | 20.85945946 | 1.904120238 | 0.388 | 7.093681014 | 4.595543544 | 0.051860003 | 7.24 | 5.09 | 3.09 | 22.35 |
| 0.112 | 27.56428571 | 1.927442343 | 0.297 | 7.184681014 | 4.654496641 | 0.039696961 | 8.28 | 5.09 | 3.0872 | 25.56 |

Furthermore, the parameter ΔS/(Dx/2) influences the optical performance of a camera device and eventually to determine a preferred range of ΔS/(Dx/2) (i.e. the condition "0 mm<ΔS/(Dx/2)<8 mm"). The effect of different values of ΔS/(Dx/2) on optical performance will be described in detail below.

Table 14 shows data for the camera device with different values of ΔS/(Dx/2), wherein f is an effective focal length of the camera device, Dx is a maximum dimension of the hole, Dy is a minimum dimension of the hole, ΔS is a difference between the area of the circle having the diameter of Dx and a cross sectional area of the hole, and F-number is a F-number of the camera device. The value of f is fixed to 15 mm, the value of Dx ranges from 5.55 mm to 15 mm, the value of Dy ranges from 5.55 mm to 0.1 mm, the value of ΔS/(Dx/2) ranges from 0 mm to 23.35 mm, and the value of F-number ranges from 2.70 to 10.85 respectively.

TABLE 14

| f (mm) | Dx (mm) | Dy (mm) | ΔS (mm²) | ΔS/(Dx/2) (mm) | F-number |
|---|---|---|---|---|---|
| 15 | 5.55 | 5.55 | 0 | 0 | 2.70 |
| 15 | 5.55 | 5 | 0.8801625 | 0.317175676 | 2.75 |
| 15 | 5.55 | 2 | 14.1299625 | 5.091878378 | 4.19 |
| 15 | 5.55 | 0.5 | 21.6686625 | 7.808527027 | 8.38 |
| 15 | 10 | 0.2 | 76.50013334 | 15.30002667 | 9.39 |
| 15 | 15 | 0.1 | 175.1250111 | 23.35000148 | 10.85 |

Figure 8A:
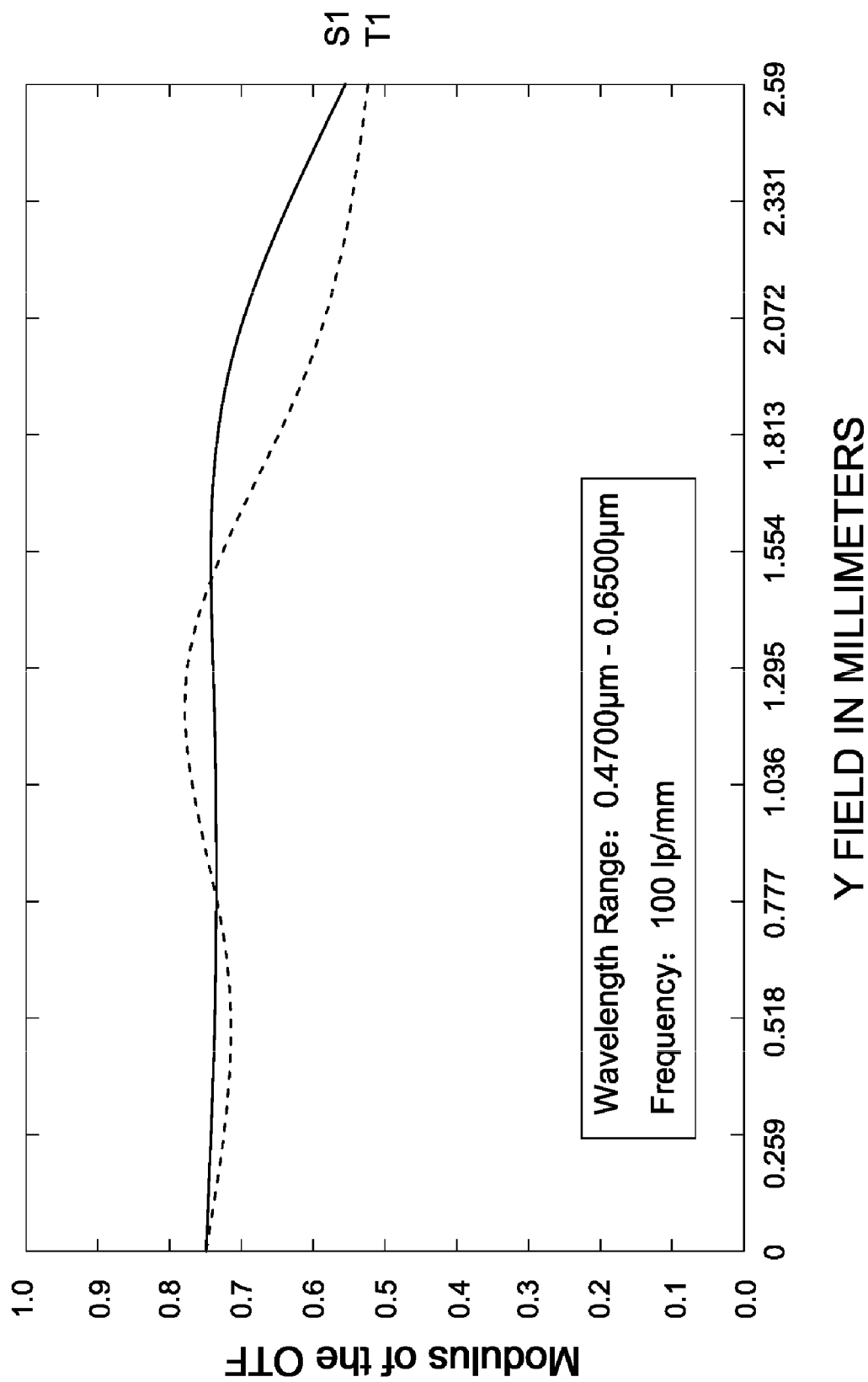
FIG. 8A is a modulation transfer function diagram of the camera device in Table 14 with a circular annular body, wherein $\Delta S/(Dx/2)$ is equal to 0 mm.
Figure 8B:
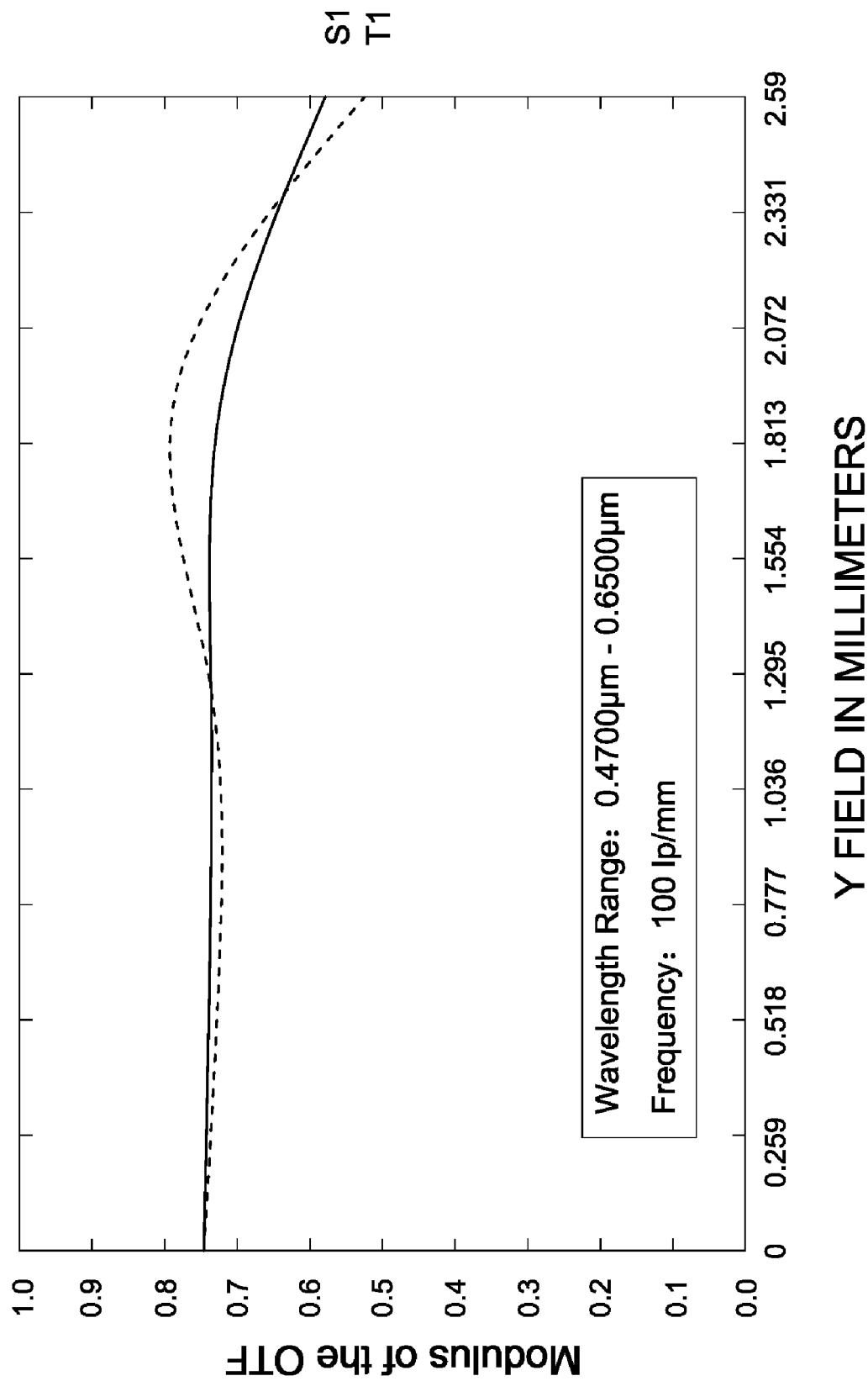
FIG. 8B is a modulation transfer function diagram of the camera device in Table 14 with a non-circular annular body, wherein $\Delta S/(Dx/2)$ is equal to 0.317175676 mm.
Figure 8C:
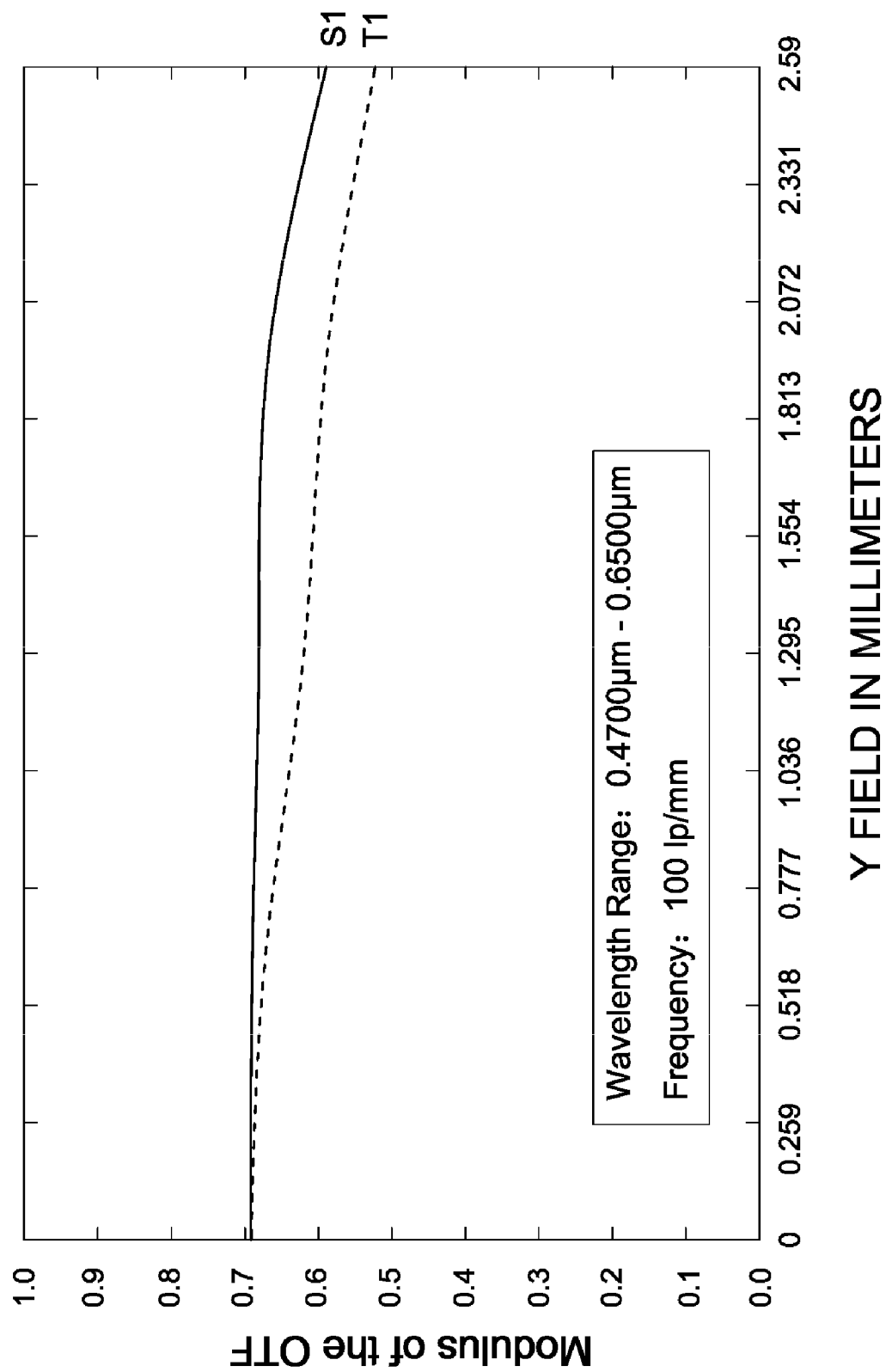
FIG. 8C is a modulation transfer function diagram of the camera device in Table 14 with a non-circular annular body, wherein $\Delta S/(Dx/2)$ is equal to 5.091878378 mm.
Figure 8D:
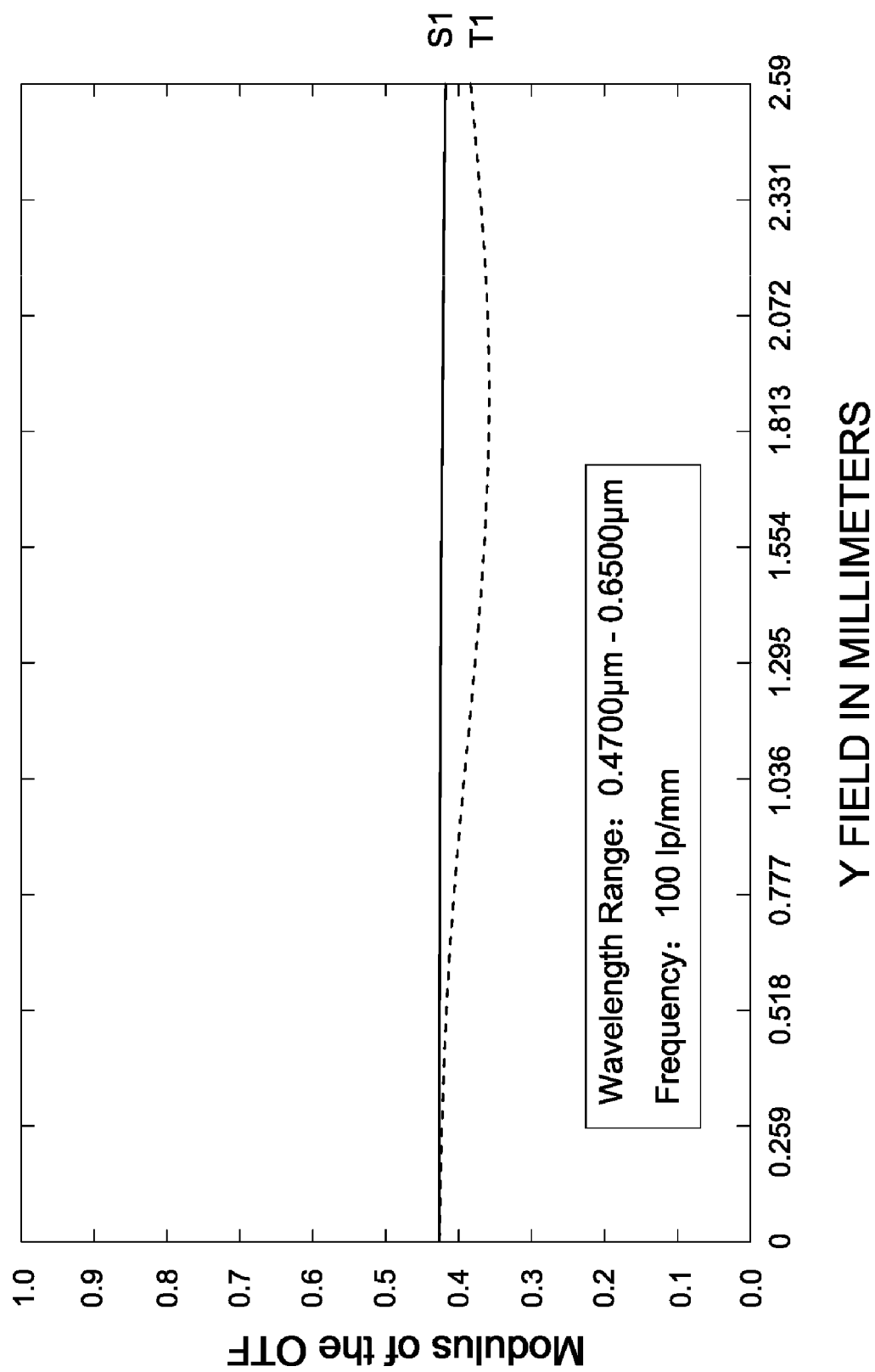
FIG. 8D is a modulation transfer function diagram of the camera device in Table 14 with a non-circular annular body, wherein $\Delta S/(Dx/2)$ is equal to 7.808527027 mm.
Figure 8E:
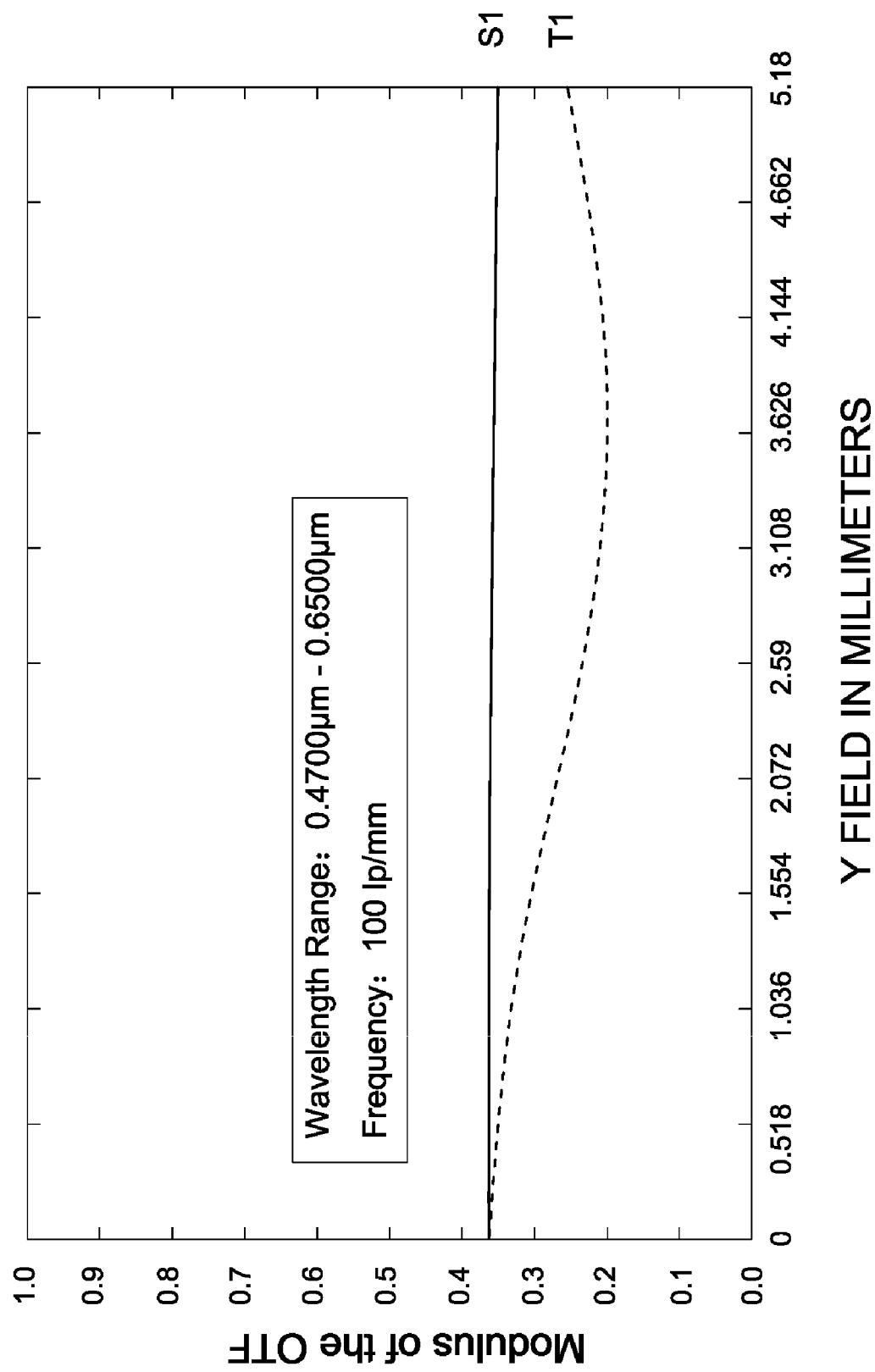
FIG. 8E is a modulation transfer function diagram of the camera device in Table 14 with a non-circular annular body, wherein $\Delta S/(Dx/2)$ is equal to 15.30002667 mm.
Figure 8F:
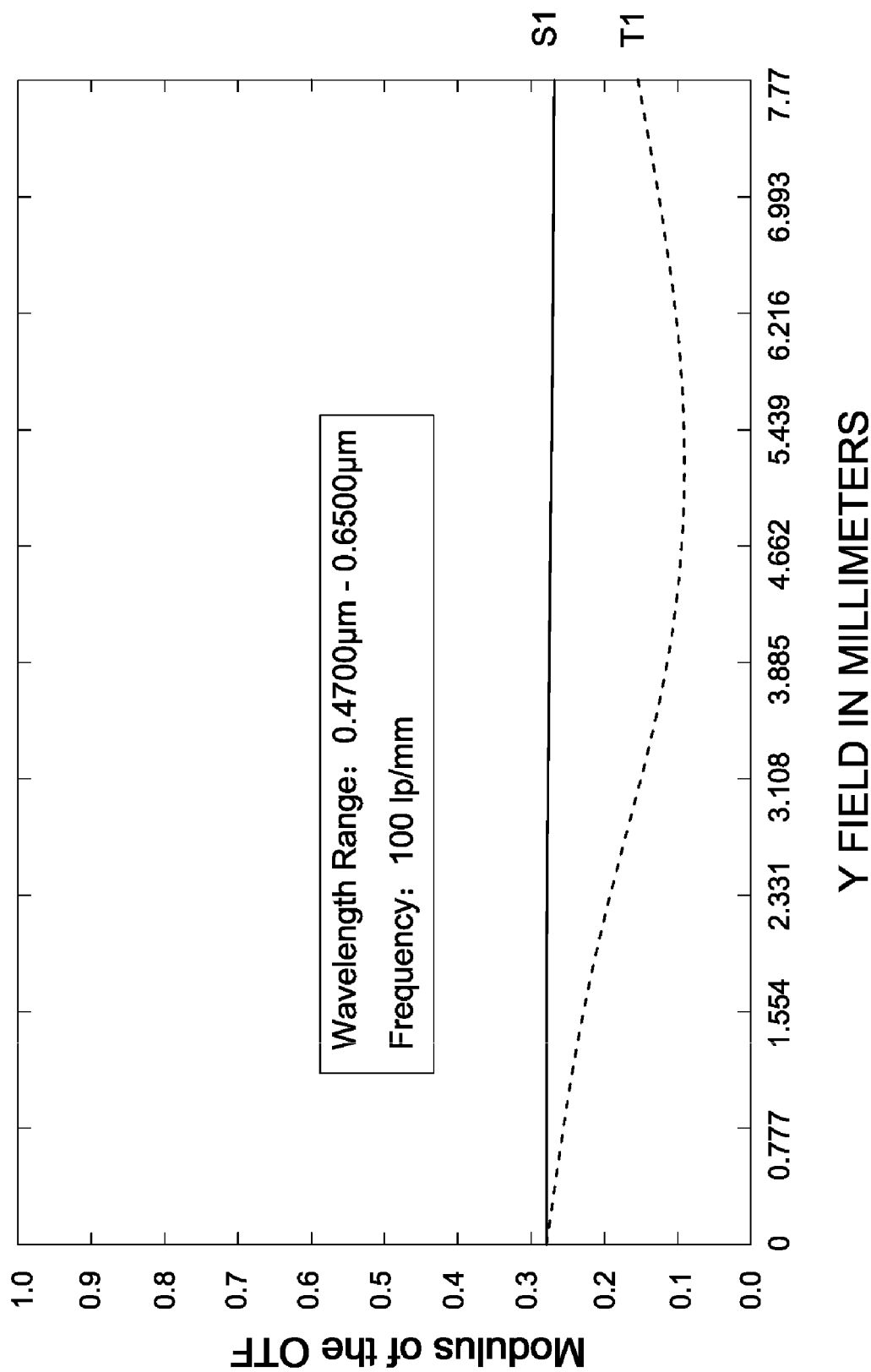
FIG. 8F is a modulation transfer function diagram of the camera device in Table 14 with a non-circular annular body, wherein $\Delta S/(Dx/2)$ is equal to 23.35000148 mm.

FIG. 8A shows a MTF diagram of different fields of view for a camera device in Table 14 with a circular annular body (FIG. 2B), wherein the effective focal length is equal to 15 mm, F-number is equal to 2.70, and ΔS/(Dx/2) is equal to 0 mm, and Table 15A shows the MTF values of different fields of view. FIG. 8B shows a MTF diagram of different fields of view for a camera device in Table 14 with a non-circular annular body (FIG. 2A), wherein the effective focal length is equal to 15 mm, F-number is equal to 2.75, and ΔS/(Dx/2) is equal to 0.317175676 mm, and Table 15B shows the MTF values of different fields of view. FIG. 8C shows a MTF diagram of different fields of view for a camera device in Table 14 with a non-circular annular body (FIG. 2A), wherein the effective focal length is equal to 15 mm, F-number is equal to 4.19, and ΔS/(Dx/2) is equal to 5.091878378 mm, and Table 15C shows the MTF values of different fields of view. FIG. 8D shows a MTF diagram of different fields of view for a camera device in Table 14 with a non-circular annular body (FIG. 2A), wherein the effective focal length is equal to 15 mm, F-number is equal to 8.38, and ΔS/(Dx/2) is equal to 7.808527027 mm, and Table 15D shows the MTF values of different fields of view. FIG. 8E shows a MTF diagram of different fields of view for a camera device in Table 14 with a non-circular annular body (FIG. 2A), wherein the effective focal length is equal to 15 mm, F-number is equal to 9.39, and ΔS/(Dx/2) is equal to 15.30002667 mm, and Table 15E shows the MTF values of different fields of view. FIG. 8F shows a MTF diagram of different fields of view for a camera device in Table 14 with a non-circular annular body (FIG. 2A), wherein the effective focal length is equal to 15 mm, F-number is equal to 10.85, and ΔS/(Dx/2) is equal to 23.35000148 mm, and Table 15F shows the MTF values of different fields of view. From FIG. 8B, Table 15B, FIG. 8C, Table 15C, FIG. 8D, Table 15D there is a better MTF when the value of ΔS/(Dx/2) ranges from 0.31 to 7.80, and from FIG. 8E, Table 15E, FIG. 8F, Table 15F there is a worse MTF when the value of ΔS/(Dx/2) ranges from 15.3 to 23.35. That is to say, a camera device with a non-circular annular body satisfying the condition "0 mm<ΔS/(Dx/2)<8 mm" has better optical performance than a camera device without satisfying the condition "0 mm<ΔS/(Dx/2)<8 mm". The difference between a camera device satisfying the condition "0 mm<ΔS/(Dx/2)<8 mm" and a camera device without satisfying the condition "0 mm<ΔS/(Dx/2)<8 mm" is significant. The larger the ΔS in the conditional expression "0 mm<ΔS/(Dx/2)<8 mm" (i.e. the larger the hole area difference between the circular annular body and the non-circular annular body), the smaller the Dy of the non-circular annular body. That is, the thickness of the camera device with non-circular annular body becomes thinner.

TABLE 15A

| Field of View | MTF T | MTF S |
|---|---|---|
| 0F | 0.749133 | 0.749133 |
| 0.1F | 0.724191 | 0.742303 |
| 0.2F | 0.714627 | 0.736986 |
| 0.3F | 0.734486 | 0.734646 |
| 0.4F | 0.768838 | 0.735651 |
| 0.5F | 0.774714 | 0.739303 |
| 0.6F | 0.723670 | 0.742323 |
| 0.7F | 0.645439 | 0.732012 |
| 0.8F | 0.581753 | 0.694235 |
| 0.9F | 0.545362 | 0.629419 |
| 0.10F | 0.523760 | 0.55521 |

TABLE 15B

| Field of View | MTF T | MTF S |
|---|---|---|
| 0F | 0.745762 | 0.745762 |
| 0.1F | 0.736408 | 0.742345 |
| 0.2F | 0.728005 | 0.739209 |
| 0.3F | 0.721697 | 0.736649 |
| 0.4F | 0.722777 | 0.735363 |
| 0.5F | 0.740555 | 0.736432 |
| 0.6F | 0.775200 | 0.738319 |
| 0.7F | 0.792350 | 0.7297 |
| 0.8F | 0.751554 | 0.697656 |
| 0.9F | 0.649689 | 0.642221 |
| 0.10F | 0.524314 | 0.578623 |

TABLE 15C

| Field of View | MTF T | MTF S |
|---|---|---|
| 0F | 0.691107 | 0.691107 |
| 0.1F | 0.686264 | 0.691267 |
| 0.2F | 0.677419 | 0.69036 |
| 0.3F | 0.660844 | 0.687405 |
| 0.4F | 0.638732 | 0.683257 |
| 0.5F | 0.619006 | 0.680549 |
| 0.6F | 0.606792 | 0.67996 |
| 0.7F | 0.595950 | 0.674649 |
| 0.8F | 0.578078 | 0.656433 |
| 0.9F | 0.551471 | 0.624928 |
| 0.10F | 0.522083 | 0.58878 |

TABLE 15D

| Field of View | MTF T | MTF S |
|---|---|---|
| 0F | 0.426369 | 0.426369 |
| 0.1F | 0.422656 | 0.426444 |
| 0.2F | 0.416657 | 0.426365 |
| 0.3F | 0.406209 | 0.425986 |
| 0.4F | 0.391902 | 0.425295 |
| 0.5F | 0.376984 | 0.424411 |
| 0.6F | 0.364751 | 0.423422 |
| 0.7F | 0.358269 | 0.422285 |
| 0.8F | 0.360369 | 0.42093 |
| 0.9F | 0.370316 | 0.419377 |
| 0.10F | 0.383424 | 0.417809 |

TABLE 15E

| Field of View | MTF T | S |
|---|---|---|
| 0F | 0.362712 | 0.362712 |
| 0.1F | 0.349888 | 0.362954 |
| 0.2F | 0.331798 | 0.362913 |
| 0.3F | 0.303516 | 0.362318 |
| 0.4F | 0.267457 | 0.361145 |
| 0.5F | 0.233147 | 0.35961 |
| 0.6F | 0.209147 | 0.357902 |
| 0.7F | 0.199367 | 0.356072 |
| 0.8F | 0.206372 | 0.354141 |
| 0.9F | 0.227601 | 0.352136 |
| 0.10F | 0.254376 | 0.350199 |

TABLE 15F

| Field of View | MTF T | S |
|---|---|---|
| 0F | 0.278184 | 0.278184 |
| 0.1F | 0.255295 | 0.278357 |
| 0.2F | 0.227651 | 0.278254 |
| 0.3F | 0.190879 | 0.27761 |
| 0.4F | 0.148811 | 0.276386 |
| 0.5F | 0.113223 | 0.274758 |
| 0.6F | 0.093761 | 0.272929 |
| 0.7F | 0.090950 | 0.271167 |
| 0.8F | 0.103091 | 0.269737 |
| 0.9F | 0.126393 | 0.268671 |
| 0.10F | 0.153685 | 0.26783 |

The F-number of a camera device is equal to the effective focal length (EFL) divided by the entrance pupil diameter (D), and the mathematical equation can be represented by F-number=EFL/D. Since the entrance pupil area A is equal to $\pi \times (D/2)^2$, F-number=EFL/D can be rewritten as F-number=EFL/$\sqrt{4A/\pi}$. Therefore, the larger the entrance pupil area A, the smaller the F-number when the effective focal length (EFL) of the camera device is the same.

Generally speaking, the shape of the aperture is circular. In order to reduce the thickness of the camera device, the thickness of the aperture must be reduced also. However, the thickness reduction of the aperture will reduce the amount of light entering the camera device, that is, the F-number becomes larger and results in poor image quality. In the case of reduced aperture thickness, under the same camera device thickness in order to maintain a fairly high level of optical performance (such as F-number, MTF, etc.) and increase the amount of light entering the lens is necessary, so that the shape of the aperture will become non-circular. In order to maintain fairly high level optical performance of the camera device, the camera device must satisfies one of the following six conditions:

$$EFL/\sqrt{4A/\pi}=(EFL/Dx+EFL/Dy)\times K1; K1\leq 0.49, \quad (1)$$

$$EFL/\sqrt{4A/\pi}=(EFL/Dx\times EFL/Dy)\times K2; K2<1/(EFL/\sqrt{4A/\pi})-0.01, \quad (2)$$

$$EFL/\sqrt{4A/\pi}=(EFL/Dx-EFL/Dy)\times K3; -7<K3<-2, \quad (3)$$

$$(EFL/Dx)/(EFL/Dy)\leq 0.9, \quad (4)$$

$$0 \text{ mm}<\Delta S/(Dx/2)<8 \text{ mm}, \quad (5)$$

$$0.198<(Dx-Dy)/(Dx/2)<2, \quad (6)$$

wherein EFL is an effective focal length of the camera device, A is an area of the fixed hole, Dx is a maximum dimension of the fixed hole through which the optical axis passes, Dy is a minimum dimension of the fixed hole through which the optical axis passes, ΔS is a difference between an area of a circle having a diameter of Dx and a cross sectional area of the fixed hole, K1 is a coefficient, K2 is a coefficient, and K3 is a coefficient. Furthermore, the data from Tables 1-2, 6-9, 10A-13A, and 10B-13B also can be used to calculate the condition values for conditions (1)-(6) and all of the calculated condition values satisfy conditions (1)-(6).

Figure 9:
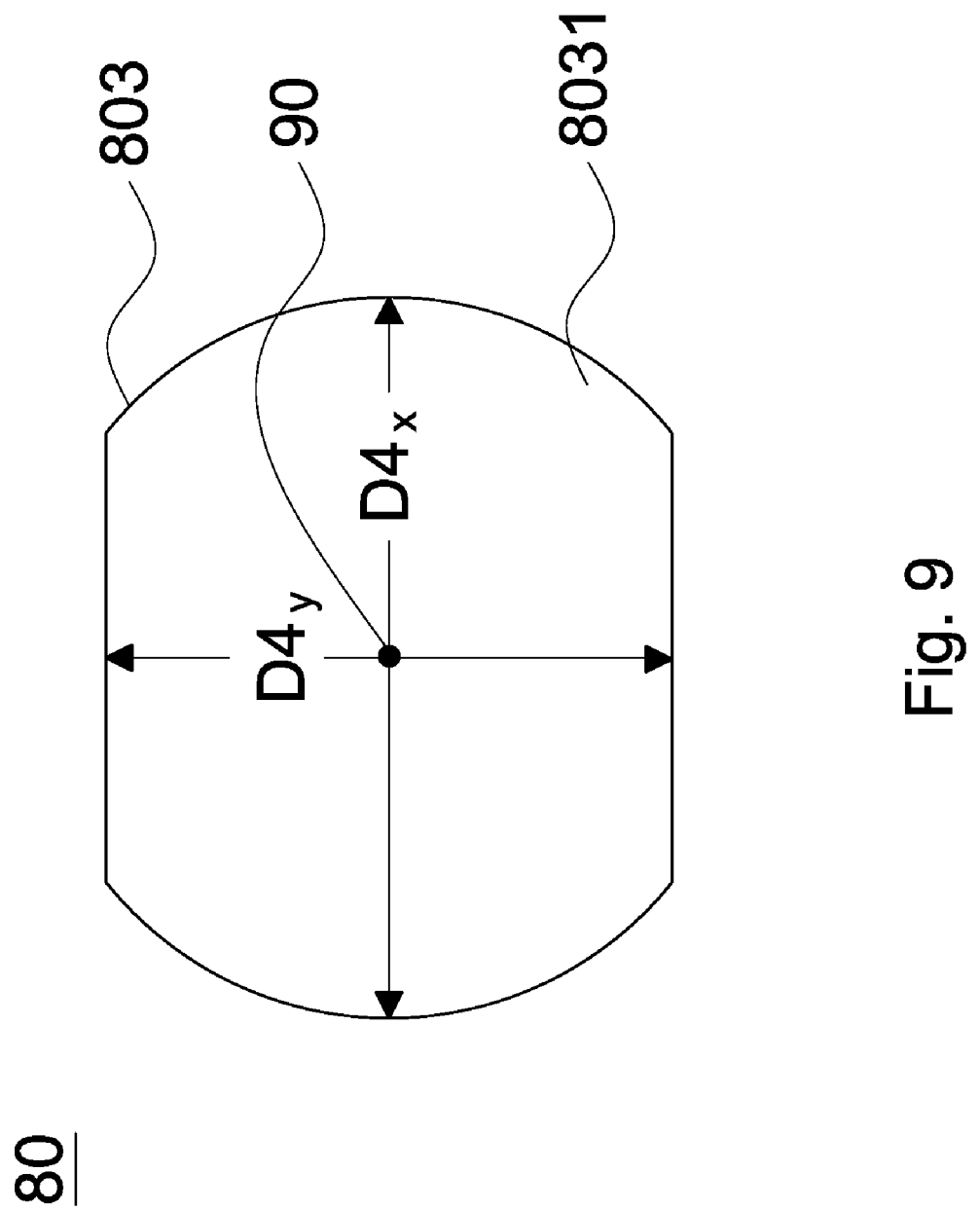
FIG. 9 is a diagram of an inner circumferential portion of an annular body of a camera device in accordance with a fourth embodiment of the invention.

Please refer to FIG. 2B and FIG. 9. FIG. 2B shows the traditional annular body design with a circular diameter of $D1y_c$, wherein $D1y_c$ is equal to $D1x_c$. FIG. 9 is a diagram of an inner circumferential portion of an annular body of a camera device in accordance with a fourth embodiment of the invention. FIG. 9 and FIG. 2B also show that D4y is equal to $D1y_c$, D4x is larger than $D1x_c$, and D4y does not exceed the maximum thickness requirement of the mobile phone.

Table 16 shows the parameters and condition values for conditions (1)-(6) in accordance with the traditional annular body. As can be seen from Table 16, the camera device (not shown) with traditional annular body doesn't satisfy the conditions (1)-(6).

TABLE 16

| f-number | 2.86 | EFL | 14.9947 mm | $D1x_c$ | 4.29307 mm |
|---|---|---|---|---|---|
| $D1y_c$ | 4.29307 mm | A | 14.475 mm² | ΔS | 0 mm² |
| $EFL/D1x_c$ | 3.49 | $EFL/D1y_c$ | 3.49 | $EFL/\sqrt{4A/\pi}$ | 2.86 |
| K1 | 0.50 | K2 | 0.29 | K3 | Division by zero |
| $1/(EFL/\sqrt{4A/\pi}) - 0.01$ | 0.28 | $(EFL/D1x_c)/(EFL/D1y_c)$ | 1 | ΔS/(Dx/2) | 0 mm |
| (Dx − Dy)/(Dx/2) | 0 | | | | |

FIG. 9 is a diagram of an inner circumferential portion of an annular body of a camera device in accordance with a fourth embodiment of the invention. As shown in FIG. 9, a camera device (not shown) in a fourth embodiment includes a plurality of lenses (not shown) and an annular body 80, which are arranged between an object side (not shown) and an image side (not shown) along an optical axis 90. The annular body 80 is disposed between the object side (not shown) and the plurality of lenses (not shown). The annular body 80 includes an annular main body (not shown), an outer circumferential portion (not shown), and an inner circumferential portion 803. The outer circumferential portion (not shown) and the inner circumferential portion 803 include two straight edges and two arcuate edges respectively. The annular main body (not shown) connects to the outer circumferential portion (not shown) and the inner circumferential portion 803. The annular main body (not shown) is disposed between the outer circumferential portion (not shown) and the inner circumferential portion 803. The inner circumferential portion 803 is shaped like an oak barrel (non-circular) and surrounds the optical axis 90 to form a hole 8031. D4x is a maximum dimension of the hole 8031 defined by the inner circumferential portion 803 through which the optical axis 90 passes and D4y is a minimum dimension of the hole 8031 defined by the inner circumferential portion 803 through which the optical axis 90 passes. The hole 8031 allows the light rays from the object side (not shown) to pass through, and its dimension will affect the amount of the light rays passing through the camera device (not shown). Therefore, the main purpose of the annular body 80 is to work as an aperture. When the maximum dimension D4x of the hole 8031 is fixed, the annular body 80 will be flatter if the minimum dimension D4y which is smaller than the maximum dimension D4x is reduced. Therefore, if the flattened annular body 80 is included in a general lens assembly or a periscopic lens assembly, then the thickness of the lens assembly can be effectively reduced.

Table 17 shows the parameters and condition values for conditions (1)-(6) in accordance with the fourth embodiment of the invention. As can be seen from Table 17, the camera device (not shown) of the fourth embodiment of the invention satisfies the conditions (1)-(6). Furthermore, the data from Tables 1-2, 6-9, 10A-13A, and 10B-13B also can be used to calculate the condition values for conditions (1)-(6) and all of the calculated condition values satisfy conditions (1)-(6).

shown) connects to the outer circumferential portion (not shown) and the inner circumferential portion 1003. The annular main body (not shown) is disposed between the outer circumferential portion (not shown) and the inner circumferential portion 1003. The inner circumferential portion 1003 is shaped like a hexagon (non-circular) and surrounds the optical axis 110 to form a hole 10031. D4x is a maximum dimension of the hole 10031 defined by the inner circumferential portion 1003 through which the optical axis 110 passes and D4y is a minimum dimension of the hole 10031 defined by the inner circumferential portion 1003 through which the optical axis 110 passes. The hole 10031 allows the light rays from the object side (not shown) to pass through, and its dimension will affect the amount of the light rays passing through the camera device (not shown). Therefore, the main purpose of the annular body 100 is to work as an aperture. When the maximum dimension D4x of the hole 10031 is fixed, the annular body 100 will be flatter if the minimum dimension D4y which is smaller than the maximum dimension D4x is reduced. Therefore, if the flattened annular body 100 is included in a general lens assembly or a periscopic lens assembly, then the thickness of the lens assembly can be effectively reduced.

Table 18 shows the parameters and condition values for conditions (1)-(6) in accordance with the fifth embodiment

TABLE 17

| f-number | 2.97 | EFL | 14.9947 mm | D4x | 5.5536 mm |
| D4y | 4.29307 mm | A | 19.98 mm$^2$ | ΔS | 4.24 mm$^2$ |
| EFL/D4x | 2.69 | EFL/D4y | 3.49 | EFL/$\sqrt{4A/\pi}$ | 2.97 |
| K1 | 0.48 | K2 | 0.32 | K3 | −3.75 |
| 1/(EFL/$\sqrt{4A/\pi}$) − 0.01 | 0.33 | (EFL/D4x)/(EFL/D4y) | 0.77 | ΔS/(Dx/2) | 1.53 mm |
| (Dx − Dy)/(Dx/2) | 0.454 | | | | |

Figure 10:
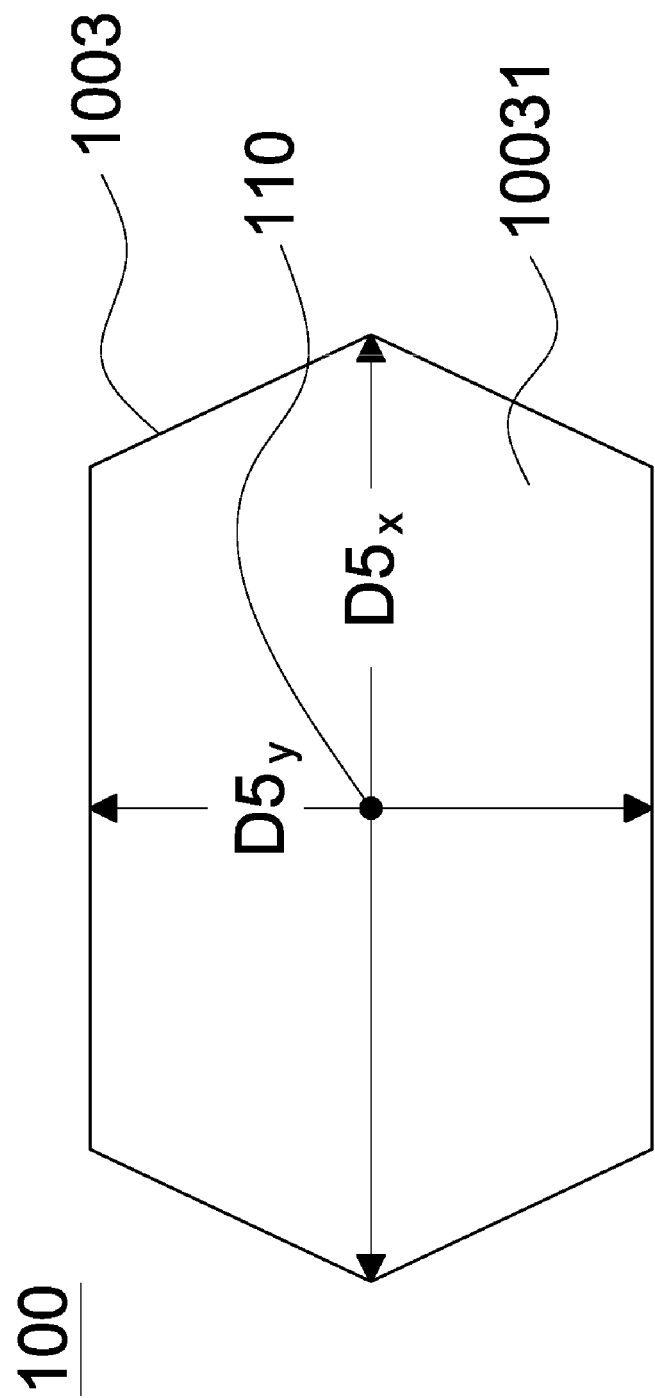
FIG. 10 is a diagram of an inner circumferential portion of an annular body of a camera device in accordance with a fifth embodiment of the invention.

FIG. 10 is a diagram of an inner circumferential portion of an annular body of a camera device in accordance with a fifth embodiment of the invention. As shown in FIG. 10, a camera device (not shown) in a fifth embodiment includes a plurality of lenses (not shown) and an annular body 100, which are arranged between an object side (not shown) and an image side (not shown) along an optical axis 110. The annular body 100 is disposed between the object side (not shown) and the plurality of lenses (not shown). The annular body 100 includes an annular main body (not shown), an outer circumferential portion (not shown), and an inner circumferential portion 1003. The outer circumferential portion (not shown) and the inner circumferential portion 1003 include six straight edges. The annular main body (not of the invention. As can be seen from Table 18, the camera device (not shown) of the fifth embodiment of the invention satisfies the conditions (1)-(6). Furthermore, the data from Tables 1-2, 6-9, 10A-13A, and 10B-13B also can be used to calculate the condition values for conditions (1)-(6) and all of the calculated condition values satisfy conditions (1)-(6).

TABLE 18

| f-number | 3.02 | EFL | 14.9828 mm | D5x | 5.1649 mm |
| D5y | 4.29307 mm | A | 19.252 mm$^2$ | ΔS | 1.70 mm$^2$ |
| EFL/D5x | 2.900 | EFL/D5y | 3.489 | EFL/$\sqrt{4A/\pi}$ | 3.02 |
| K1 | 0.47 | K2 | 0.30 | K3 | −5.14 |
| 1/(EFL/$\sqrt{4A/\pi}$) − 0.01 | 0.32 | (EFL/D5x)/(EFL/D5y) | 0.83 | ΔS/(Dx/2) | 0.66 mm |
| (Dx − Dy)/(Dx/2) | 0.338 | | | | |

Figure 11:
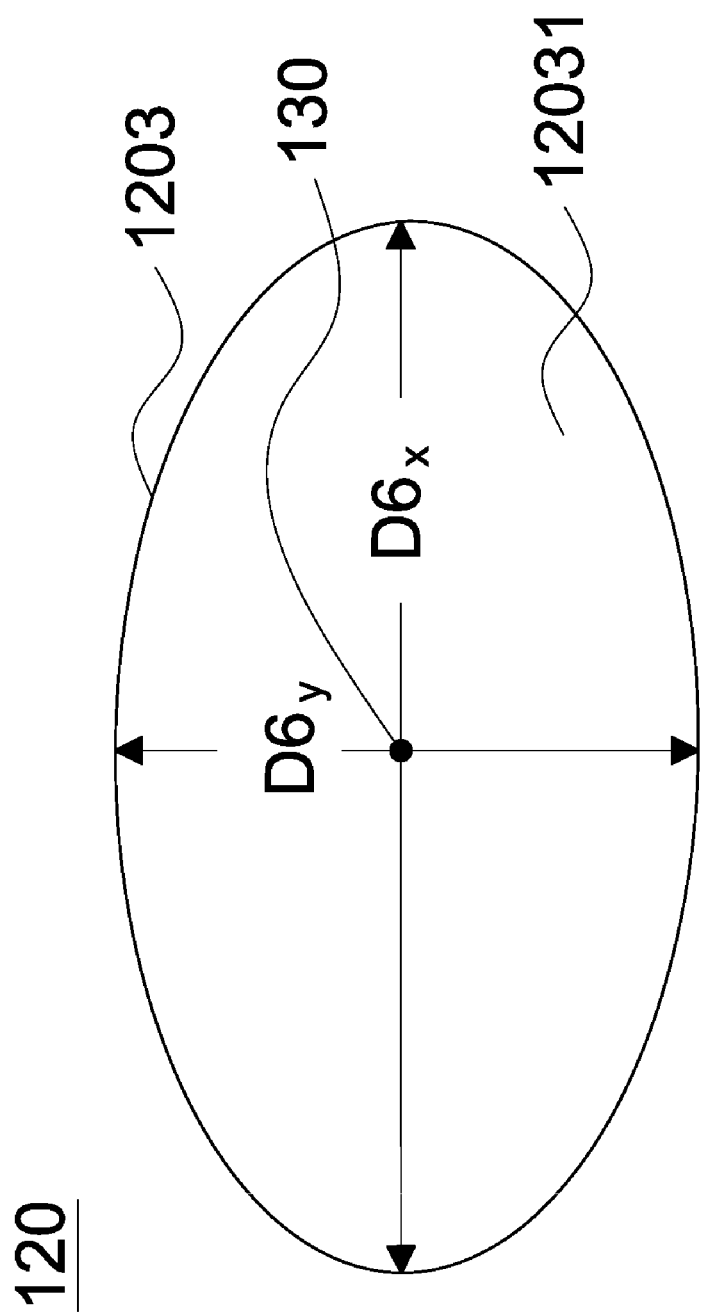
FIG. 11 is a diagram of an inner circumferential portion of an annular body of a camera device in accordance with a sixth embodiment of the invention.

FIG. 11 is a diagram of an inner circumferential portion of an annular body of a camera device in accordance with a sixth embodiment of the invention. As shown in FIG. 11, a camera device (not shown) in a sixth embodiment includes a plurality of lenses (not shown) and an annular body 120, which are arranged between an object side (not shown) and an image side (not shown) along an optical axis 130. The annular body 120 is disposed between the object side (not shown) and the plurality of lenses (not shown). The annular body 120 includes an annular main body (not shown), an outer circumferential portion (not shown), and an inner circumferential portion 1203. The annular main body (not shown) connects to the outer circumferential portion (not shown) and the inner circumferential portion 1203. The annular main body (not shown) is disposed between the outer circumferential portion (not shown) and the inner circumferential portion 1203. The inner circumferential portion 1203 is shaped like a oval (non-circular) and surrounds the optical axis 130 to form a hole 12031. D6x is a maximum dimension of the hole 12031 defined by the inner circumferential portion 1203 through which the optical axis 130 passes and D6y is a minimum dimension of the hole 12031 defined by the inner circumferential portion 1203 through which the optical axis 130 passes. The hole 12031 allows the light rays from the object side (not shown) to pass through, and its dimension will affect the amount of the light rays passing through the camera device (not shown). Therefore, the main purpose of the annular body 120 is to work as an aperture. When the maximum dimension D6x of the hole 12031 is fixed, the annular body 120 will be flatter if the minimum dimension D6y which is smaller than the maximum dimension D6x is reduced. Therefore, if the flattened annular body 120 is included in a general lens assembly or a periscopic lens assembly, then the thickness of the lens assembly can be effectively reduced.

Table 19 shows the parameters and condition values for conditions (1)-(6) in accordance with the sixth embodiment of the invention. As can be seen from Table 19, the camera device (not shown) of the sixth embodiment of the invention satisfies the conditions (1)-(6). Furthermore, the data from Tables 1-2, 6-9, 10A-13A, and 10B-13B also can be used to calculate the condition values for conditions (1)-(6) and all of the calculated condition values satisfy conditions (1)-(6).

TABLE 19

| | | | | | |
|---|---|---|---|---|---|
| f-number | 2.88 | EFL | 14.9828 mm | D6x | 5.54919 mm |
| D6y | 4.29307 mm | A | 21.1668 mm$^2$ | ΔS | 3.02 mm$^2$ |
| EFL/D6x | 2.70 | EFL/D6y | 3.49 | EFL/$\sqrt{4A/\pi}$ | 2.89 |
| K1 | 0.46 | K2 | 0.31 | K3 | −3.65 |
| 1/(EFL/$\sqrt{4A/\pi}$) − 0.01 | 0.34 | (EFL/D6x)/(EFL/D6y) | 0.77 | ΔS/(Dx/2) | 1.09 mm |
| (Dx − Dy)/(Dx/2) | 0.453 | | | | |

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A camera device comprising:
   a plurality of lenses; and
   an annular body having a fixed hole;
   wherein the plurality of lenses and the annular body are arranged between an object side and an image side along an optical axis;
   wherein the annular body is disposed between the object side and the plurality of lenses, between the plurality of lenses, or between the plurality of lenses and the image side;
   wherein the annular body comprises an annular main body, an outer circumferential portion, and an inner circumferential portion, wherein the annular main body connects to the outer circumferential portion and the inner circumferential portion, the annular main body is disposed between the outer circumferential portion and the inner circumferential portion, and the inner circumferential portion is non-circular and surrounds the optical axis to form the fixed hole;
   wherein the camera device satisfies:

$EFL/\sqrt{4A/\pi}=(EFL/Dx+EFL/Dy)\times K1$;

$K1\leq 0.49$;

wherein EFL is an effective focal length of the camera device, A is an area of the fixed hole, K1 is a constant, Dx is a maximum dimension of the fixed hole through which the optical axis passes, and Dy is a minimum dimension of the fixed hole through which the optical axis passes;
   wherein the outer circumferential portion is non-circular;
   wherein a horizontal interval and a vertical interval are defined between the outer circumferential portion and the inner circumferential portion, and a ratio of the horizontal interval to the vertical interval is between 1.1 and 27.6.

2. The camera device as claimed in claim 1, wherein the camera device satisfies:

$(EFL/Dx)/(EFL/Dy)\leq 0.9$.

3. The camera device as claimed in claim 1, wherein the camera device satisfies:

$EFL/\sqrt{4A/\pi}=(EFL/Dx\times EFL/Dy)\times K2$;

$K2<1/(EFL/\sqrt{4A/\pi})-0.01$;

wherein EFL is an effective focal length of the camera device, A is an area of the fixed hole, K2 is a constant, Dx is a maximum dimension of the fixed hole through which the optical axis passes, and Dy is a minimum dimension of the fixed hole through which the optical axis passes.

4. The camera device as claimed in claim 1, wherein the camera device satisfies:

$EFL/\sqrt{4A/\pi}=(EFL/Dx-EFL/Dy)\times K3$;

$-7<K3<-2$;

wherein EFL is an effective focal length of the camera device, A is an area of the fixed hole, K3 is a constant, Dx is a maximum dimension of the fixed hole through which the optical axis passes, and Dy is a minimum dimension of the fixed hole through which the optical axis passes.

5. The camera device as claimed in claim 1, wherein the camera device satisfies:

$0 \text{ mm}<\Delta S/(Dx/2)<8 \text{ mm}$;

wherein Dx is a maximum dimension of the fixed hole through which the optical axis passes, and ΔS is a difference between an area of a circle having a diameter of Dx and a cross sectional area of the fixed hole.

6. The camera device as claimed in claim 1, wherein the camera device satisfies:

$$0.198<(Dx-Dy)/(Dx/2)<2;$$

wherein Dx is a maximum dimension of the fixed hole through which the optical axis passes, and Dy is a minimum dimension of the fixed hole through which the optical axis passes.

7. The camera device as claimed in claim 1, further comprising a reflection device disposed between the object side and the plurality of lenses.

8. The camera device as claimed in claim 1, wherein the vertical interval is between 0.112 mm and 5.55 mm.

9. A camera device comprising:
a plurality of lenses; and
an annular body having a fixed hole;
wherein the plurality of lenses and the annular body are arranged between an object side and an image side along an optical axis;
wherein the annular body is disposed between the object side and the plurality of lenses, between the plurality of lenses, or between the plurality of lenses and the image side;
wherein the annular body comprises an annular main body, an outer circumferential portion, and an inner circumferential portion, wherein the annular main body connects to the outer circumferential portion and the inner circumferential portion, the annular main body is disposed between the outer circumferential portion and the inner circumferential portion, and the inner circumferential portion is non-circular and surrounds the optical axis to form the fixed hole;
wherein the camera device satisfies:

$$EFL/\sqrt{4A/\pi}=(EFL/Dx \times EFL/Dy) \times K2;$$

$$K2<1/(EFL/\sqrt{4A/\pi})-0.01;$$

wherein EFL is an effective focal length of the camera device, A is an area of the fixed hole, K2 is a constant, Dx is a maximum dimension of the fixed hole through which the optical axis passes, and Dy is a minimum dimension of the fixed hole through which the optical axis passes.

10. The camera device as claimed in claim 9, wherein the camera device satisfies:

$$(EFL/Dx)/(EFL/Dy) \le 0.9.$$

11. The camera device as claimed in claim 9, wherein the camera device satisfies:

$$0 \text{ mm} < \Delta S/(Dx/2) < 8 \text{ mm};$$

wherein Dx is a maximum dimension of the fixed hole through which the optical axis passes, and $\Delta S$ is a difference between an area of a circle having a diameter of Dx and a cross sectional area of the fixed hole.

12. The camera device as claimed in claim 11, wherein the camera device satisfies:

$$0.198<(Dx-Dy)/(Dx/2)<2;$$

wherein Dx is a maximum dimension of the fixed hole through which the optical axis passes, and Dy is a minimum dimension of the fixed hole through which the optical axis passes.

13. The camera device as claimed in claim 9, further comprising a reflection device disposed between the object side and the plurality of lenses.

14. The camera device as claimed in claim 9, wherein the outer circumferential portion is non-circular.

15. A camera device as claimed in claim 9,
wherein the camera device satisfies:

$$EFL/\sqrt{4A/\pi}=(EFL/Dx-EFL/Dy) \times K3;$$

$$-7<K3<-2;$$

wherein EFL is the effective focal length of the camera device, A is the area of the fixed hole, K3 is a coefficient, Dx is the maximum dimension of the fixed hole through which the optical axis passes, and Dy is the minimum dimension of the fixed hole through which the optical axis passes.

16. The camera device as claimed in claim 15, wherein the camera device satisfies:

$$(EFL/Dx)/(EFL/Dy) \le 0.9.$$

17. The camera device as claimed in claim 16, wherein the camera device satisfies:

$$0 \text{ mm} < \Delta S/(Dx/2) < 8 \text{ mm};$$

$$0.198<(Dx-Dy)/(Dx/2)<2;$$

wherein Dx is a maximum dimension of the fixed hole through which the optical axis passes, Dy is a minimum dimension of the fixed hole through which the optical axis passes, and $\Delta S$ is a difference between an area of a circle having a diameter of Dx and a cross sectional area of the fixed hole.

18. The camera device as claimed in claim 15, further comprising a reflection device disposed between the object side and the plurality of lenses, wherein the outer circumferential portion is non-circular.

* * * * *